United States Patent
Singh et al.

(10) Patent No.: US 9,875,819 B2
(45) Date of Patent: Jan. 23, 2018

(54) REACTIVITY CONTROL DEVICE FOR STORING NUCLEAR FUEL

(71) Applicant: Holtec International, Marlton, NJ (US)

(72) Inventors: Krishna P. Singh, Hobe Sound, FL (US); Stephen J. Agace, Vorhees, NJ (US)

(73) Assignee: HOLTEC INTERNATIONAL

( * ) Notice: Subject to any disclaimer, the term of this patent is extended or adjusted under 35 U.S.C. 154(b) by 201 days.

(21) Appl. No.: 15/137,842

(22) Filed: Apr. 25, 2016

(65) Prior Publication Data

US 2016/0314863 A1    Oct. 27, 2016

Related U.S. Application Data

(60) Provisional application No. 62/151,566, filed on Apr. 23, 2015.

(51) Int. Cl.
| | | |
|---|---|---|
| *G21F 5/012* | (2006.01) | |
| *G21F 5/06* | (2006.01) | |
| *G21C 19/40* | (2006.01) | |
| *G21C 19/07* | (2006.01) | |

(52) U.S. Cl.
CPC ............. *G21F 5/012* (2013.01); *G21C 19/40* (2013.01); *G21F 5/06* (2013.01); *G21C 19/07* (2013.01)

(58) Field of Classification Search
USPC ...................................................... 250/506.1
See application file for complete search history.

(56) References Cited

U.S. PATENT DOCUMENTS

| 3,801,453 A | | 4/1974 | Jones | |
|---|---|---|---|---|
| 4,551,299 A | * | 11/1985 | Shields | .................. G21C 19/10 |
| | | | | 294/906 |
| 4,683,107 A | * | 7/1987 | Baro | ...................... G21C 7/117 |
| | | | | 29/723 |
| 4,707,329 A | | 11/1987 | Freeman | |
| 4,803,042 A | * | 2/1989 | Gilmore | .................. G21F 5/012 |
| | | | | 376/272 |

(Continued)

FOREIGN PATENT DOCUMENTS

WO         2014025700           2/2014

OTHER PUBLICATIONS

Corresponding International Search Report and Written Opinion for PCT/US16/29206 dated Aug. 5, 2016.

*Primary Examiner* — Phillip A Johnston
(74) *Attorney, Agent, or Firm* — The Belles Group, P.C.

(57) ABSTRACT

A reactivity control device for storing nuclear fuel includes a top tube sheet, plurality of neutron absorber rods fixedly attached to the sheet, and a floating guide plate slideably mounted on the absorber rods for upward and downward movement between a lower position and an upper position. The reactivity control device is insertable into a spent fuel assembly in either wet storage in a spent fuel pool or dry storage in a canister. The absorber rods are inserted into empty guide tubes when the fuel assembly is removed from the nuclear fuel core normally occupied by control rods when in the reactor vessel. During installation, the device is lowered to insert the absorber rods into the guide tubes. The guide plate first engages the fuel assembly as the rods continue to slide through the plate until the tube sheet then engages the plate signaling the device is fully installed.

24 Claims, 17 Drawing Sheets

(56) References Cited

U.S. PATENT DOCUMENTS

| | | |
|---|---|---|
| 6,125,912 A | 10/2000 | Branagan et al. |
| 6,891,914 B1 * | 5/2005 | Sakashita ............... G21C 19/40 376/272 |
| 7,424,085 B2 | 9/2008 | Hertz et al. |
| 2010/0111243 A1 | 5/2010 | Monchanin et al. |

* cited by examiner

REACTIVITY CONTROL DEVICE FOR STORING NUCLEAR FUEL

CROSS-REFERENCE TO RELATED APPLICATIONS

This application claims the benefit of U.S. Provisional Application No. 62/151,566 filed Apr. 23, 2015, which is incorporated herein by reference in its entirety.

BACKGROUND

The present invention relates generally to nuclear fuel assembly, and more particularly to a highly portable device and related method for controlling the reactivity of a fuel assembly outside of the nuclear reactor vessel.

Most high capacity dry storage canisters used to store commercial nuclear fuel, such as MPC-32 in the HI-STORM 100 system (USNRC Docket #72-1014) are of the so-called Non-flux trap (NFT) type which means a single panel of neutron absorber lies between two facing fuel assemblies. The storage cells are thus tightly packed and the number of fuel assembles that can be accommodated in a cask (or canister) of a given cross section is maximized. These high capacity fuel baskets, however, suffer from the demerit that they do not meet the NRC's (Nuclear Regulatory Commission's) sub-criticality criterion (reactivity multiplier <0.95 with all uncertainties and biases factored in with 95% confidence and 95% certainty) for fresh fuel of a relatively high initial enrichment (say, 5 w/0 U-235). Even the most modern PWR fuel basket, such as the one in MPC-37 (NRC Docket #72-1032) cannot satisfy the above criticality requirement for the largest commercial PWR fuel assemblies in spite of the fact that it features neutron absorber panels with substantially greater boron areal concentration that older basket designs. Areal density of boron is the direct indicator of the neutron absorption capacity of a neutron absorber.

This deficit in the neutron absorption ability of the high capacity fuel basket is overcome by relying on the soluble boron in the fuel pool's water (permitted under USNRC's 10 CFR 72 rules) while the cask/canister is being loaded in the fuel pool. During transport, the U.S. NRC allows partial credit for fuel burn-up (USNRC ISG-8) under 10 CFR 71 rules thus enabling the high capacity fuel baskets to be used to both store and transport spent nuclear fuel.

This condition of reliance on regulatory dispensation is, however, not entirely satisfactory, because the extent of burn-up credit allowed by different regulatory jurisdictions varies widely and the actual amount of burn-up exposure garnered by a fuel assembly is subject to some uncertainty. Evidently, it would be far better to equip the fuel with additional neutron absorption capability such that no reliance on boron credit or burn-up credit is necessary.

An improved approach is desired for storing nuclear fuel and controlling reactivity.

BRIEF SUMMARY

This disclosure describes a reactivity control device which is intended to be installed to add reactivity mitigation capability to a nuclear fuel assembly while it is stored remotely from the reactor vessel such as in a spent fuel pool and thereafter when transferred to dry storage in a canister. This device may be arbitrarily referred to as "HI-SERT" for convenience of reference and not limitation. Use of the HI-SERT device is intended to require no reliance on boron credit or burn-up credit described above.

In one aspect, a reactivity control device for storing nuclear fuel includes: a top tube sheet; an array comprising a plurality of vertically elongated neutron absorber rods fixedly attached to the top tube sheet, the absorber rods arranged parallel to each other; and a floating guide plate slideably mounted on the absorber rods for upward and downward movement along the absorber rods, the floating guide plate movable between a lower position proximate to bottom ends of the absorber rods and an upper position abuttingly engaging the top tube sheet.

In one aspect, a reactivity control system for storing nuclear fuel includes: a nuclear fuel assembly comprising a bottom nozzle box, a top nozzle box, a plurality of fuel rods extending vertically between the nozzle boxes, and a plurality of guide tubes extending vertically between the nozzle boxes; a reactivity control device comprising a top tube sheet, a plurality of neutron absorber rods fixedly attached to the top tube sheet, and a floating guide plate slideably mounted on the absorber rods for upward and downward movement along the absorber rods, the absorber rods removably insertable into the guide tubes of the fuel assembly; wherein the reactivity control device has a first uninstalled position prior to insertion of the absorber rods into the fuel assembly in which the floating guide plate is spatially separated from the top tube sheet, and a second installed position after insertion of the absorber rods into the guide tubes of the fuel assembly in which the floating guide plate is abuttingly engaged with the top tube sheet.

A method for controlling reactivity in a spent nuclear fuel assembly removed from a nuclear reactor core is provided. The method includes: removing a spent fuel assembly from a nuclear reactor core; positioning a reactivity control device above the spent fuel assembly, the device comprising a top tube sheet, a plurality of absorber rods fixedly attached to the top tube sheet, and a floating guide plate slideably mounted on the absorber rods for upward and downward movement along the absorber rods, the top tube sheet and floating guide plate being spatially separated; aligning each of the absorber rods with a corresponding one of a plurality of guide tubes disposed in the spent fuel assembly; lowering the reactivity control device toward the spent fuel assembly; inserting the absorber rods into the guide tubes; abuttingly engaging firstly the floating guide plate with a top of the fuel assembly; sliding the absorber rods through the floating guide plate while continuing to lower the reactivity control device toward the spent fuel assembly; and abuttingly engaging secondly the top tube sheet with the floating guide plate, wherein the absorber rods are fully inserted in the guide tubes.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein like elements are labeled similarly and in which.

Figure 1:
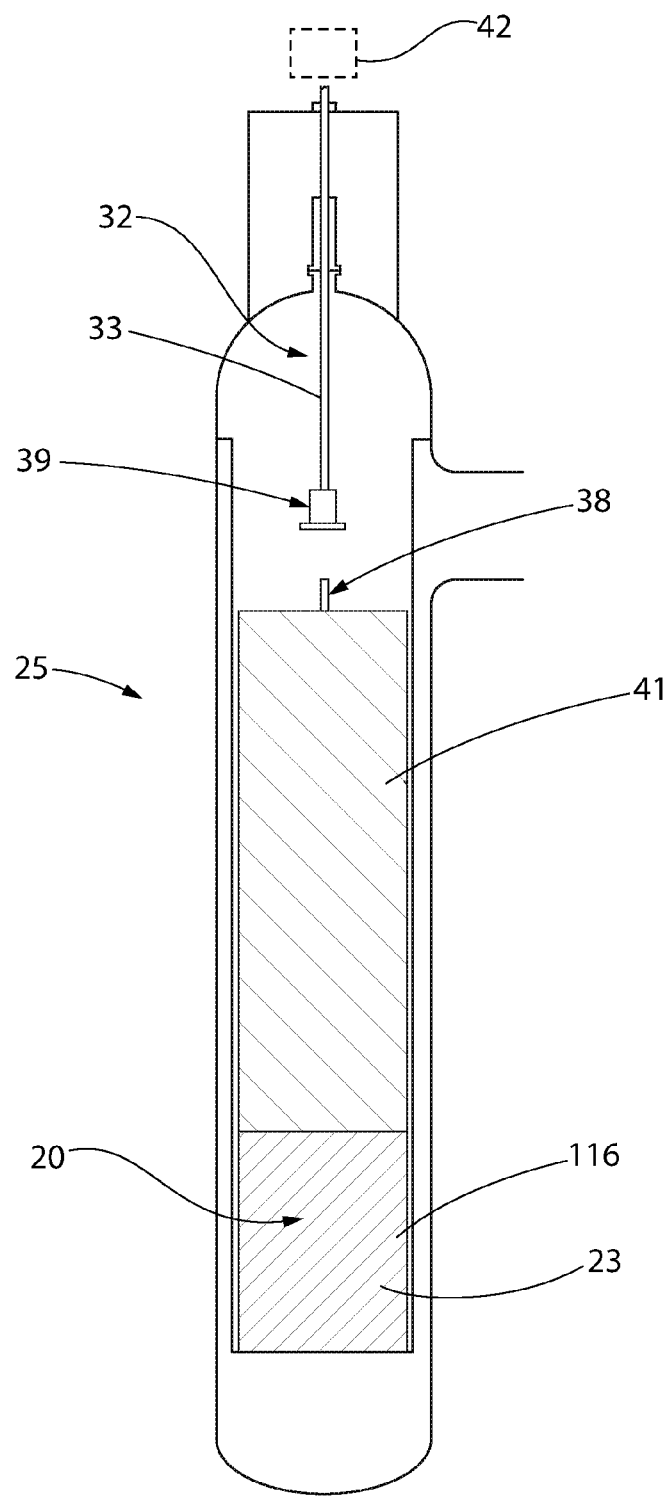
FIG. 1 is a side view schematic diagram of a nuclear reactor comprising a reactor vessel and fuel core.
Figure 2:
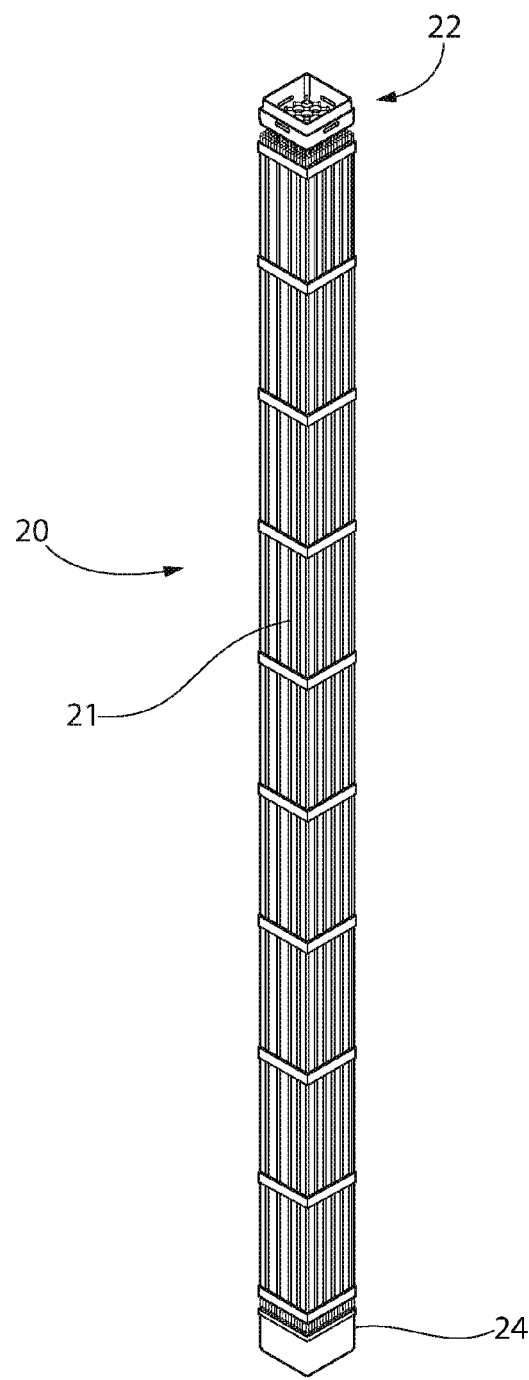
FIG. 2 is perspective view of a fuel assembly from the fuel core of the reactor of FIG. 1.
Figure 3:
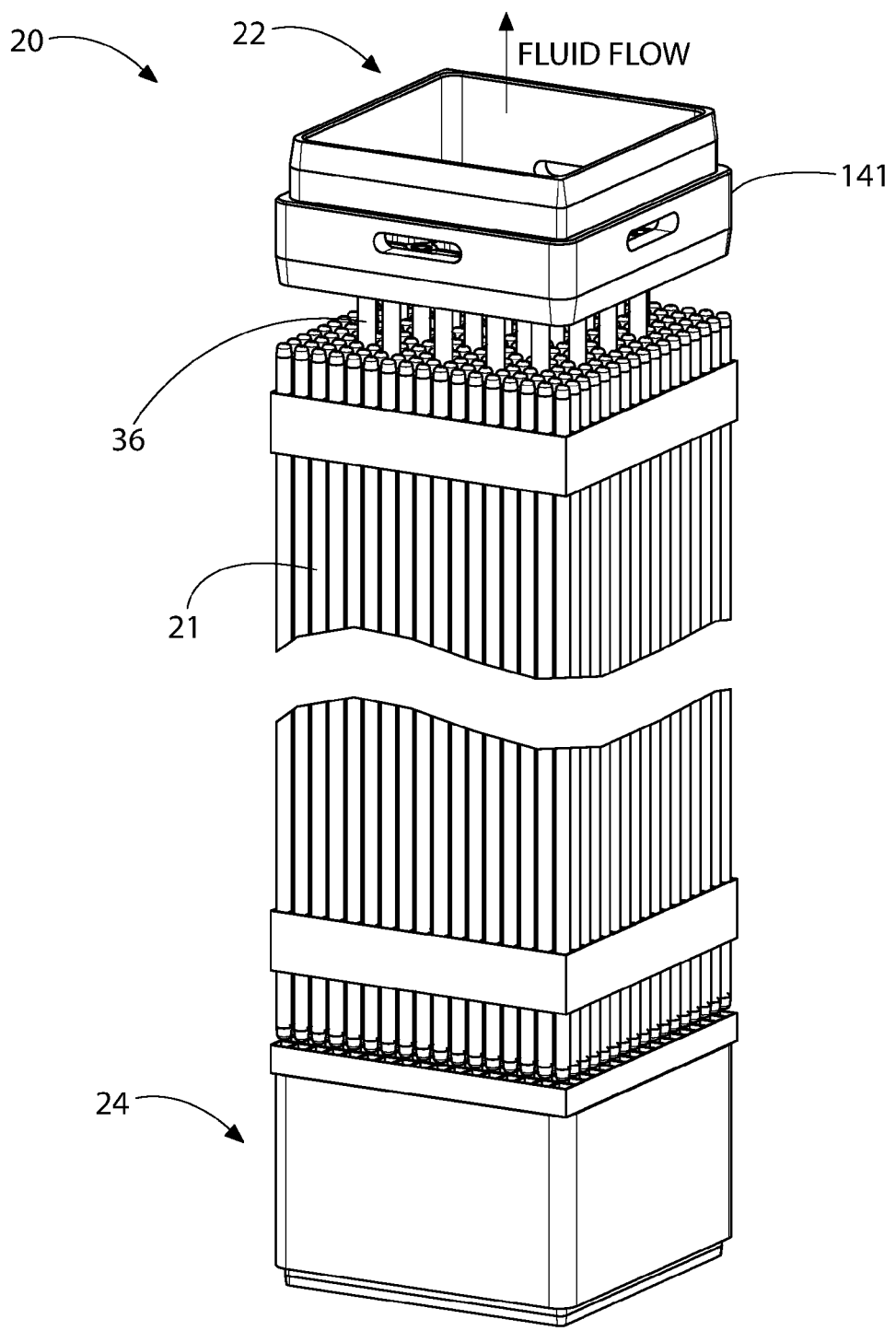
FIG. 3 is an enlarge perspective view of FIG. 2.

All drawings are schematic and not necessarily to scale.

DETAILED DESCRIPTION

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Referring initially to FIGS. 1-3 and 5, a reactor vessel 25 and a vertically elongated nuclear fuel assembly 20 (also referred to as "fuel bundle" in the art) are shown. In one embodiment, the fuel assembly 20 may be a pressurized water reactor (PWR) fuel assembly. Fuel assembly 20 is removably inserted into the reactor vessel and forms a constituent part of the fuel core 23 for heating the primary coolant circulating therein. In practice, the core comprises an array 116 of such fuel assemblies. Each fuel assembly 20 contains a plurality of fuel rods 21 mechanically coupled together in an array which is insertable and removably as a unit into/from the reactor core 23. Typical fuel assemblies 20 for a pressurized water reactor (PWR) may each hold over 150 fuel rods generally in 10×10 to 17×17 fuel rod grid arrays per assembly. The assemblies may typically be on the order of approximately 14 feet high weighing about 1400-1500 pounds each as an example. The fuel assemblies traditionally have a rectilinear cross-sectional configuration such as a square array as illustrated. Fuel assemblies are further described in commonly assigned U.S. patent application Ser. No. 14/413,807 filed Jul. 9, 2013, which is incorporated herein by reference.

The fuel rods 21 are generally cylindrical elongated hollow metal tubular structures formed of materials such as zirconium alloy or stainless steel. The tubes hold a plurality of vertically-stacked cylindrical fuel pellets formed of sintered uranium dioxide and integral burnable poisons arranged in an engineered pattern to facilitate as uniform a burning profile of the fuel as possible (in both axial and cross sectional/transverse directions). The fuel rod tubes may have an external metal cladding formed of corrosion resistant material to prevent degradation of the tube and contamination of the reactor primary coolant water. The opposite ends of the fuel rod are typically sealed.

Fuel assembly 20 further generally includes a top nozzle box 22 and bottom nozzle box 24. When mounted in the fuel core 23 inside the reactor vessel shown in FIG. 1, the nozzle boxes allows primary coolant to flow upwards through the fuel assembly 20 between the fuel rods 21 to absorb heat and circulate through the reactor vessel by natural convection. The nozzle boxes 22, 24 have a three-dimensional box-like rectilinear configuration or shape such as a square with squared or perpendicular corners.

Figure 10:
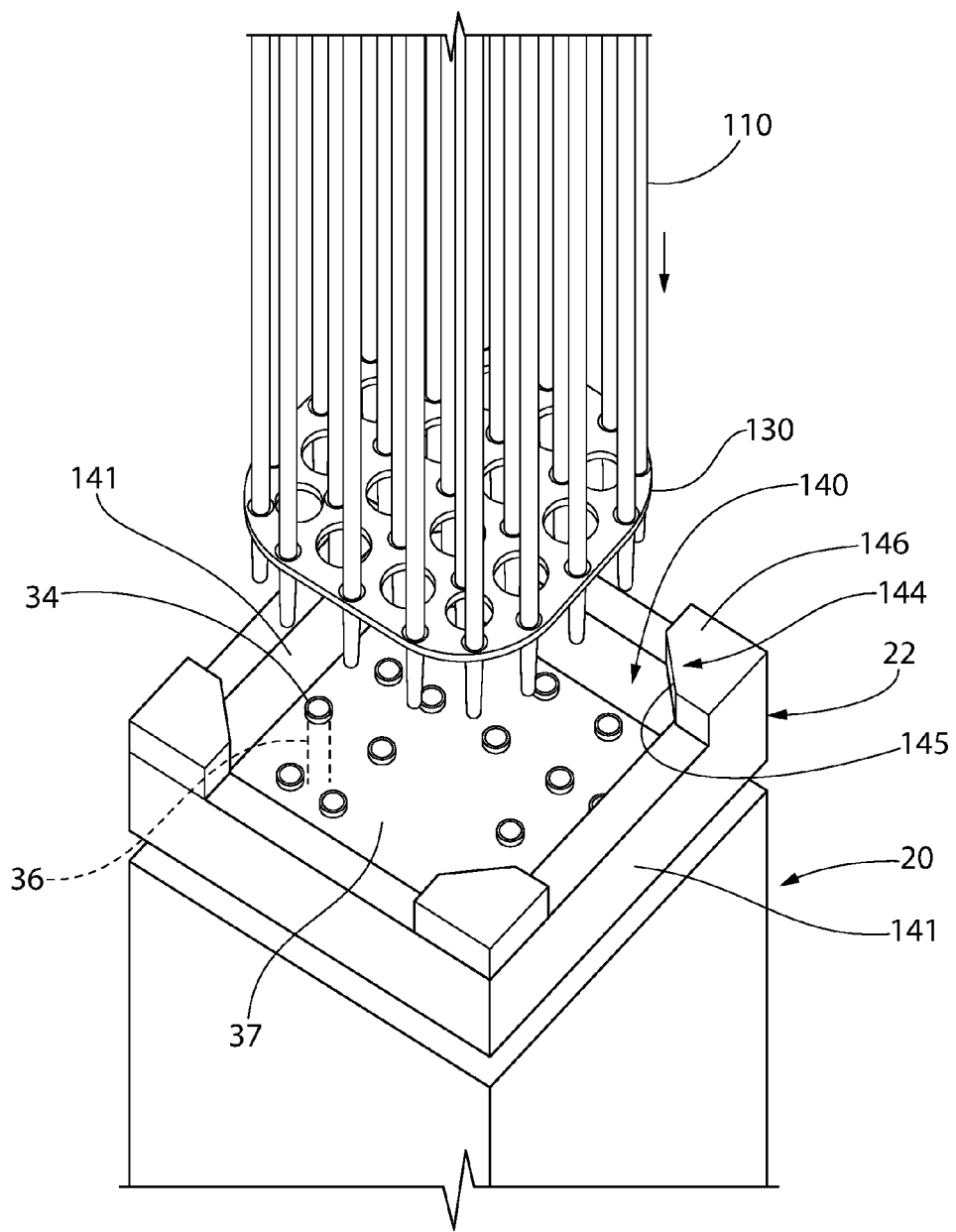
FIGS. 10-13 are perspective views showing sequential steps for installing the reactivity control device in the fuel assembly when removed from the reactor vessel and fuel core.

Referring generally to FIGS. 1-5, multiple longitudinally-extending tubular passageways known as "guide tubes" 36 which are formed within each fuel assembly 20. The guide tubes 36 enable the reactor's control rods 30 to be inserted within the fuel assembly to adjust the power generation rate in the reactor or to provide reactor shut-down. The guide tubes 36 are interspersed throughout the fuel rod matrix in the fuel assembly 20. FIG. 10 shows one example of guide tube penetrations 34 locations in a 17×17 array PWR fuel assembly widely used in the industry. Each control rod comprises a hollow tube filled with neutron absorbing boron carbide pellets. The cavities within each guide tube 36 are accessible to the control rods 30 through the penetrations 34 formed in the recessed floor plate 37 (exposed top face) of the top nozzle box 22 (see FIG. 10).

Figure 4:
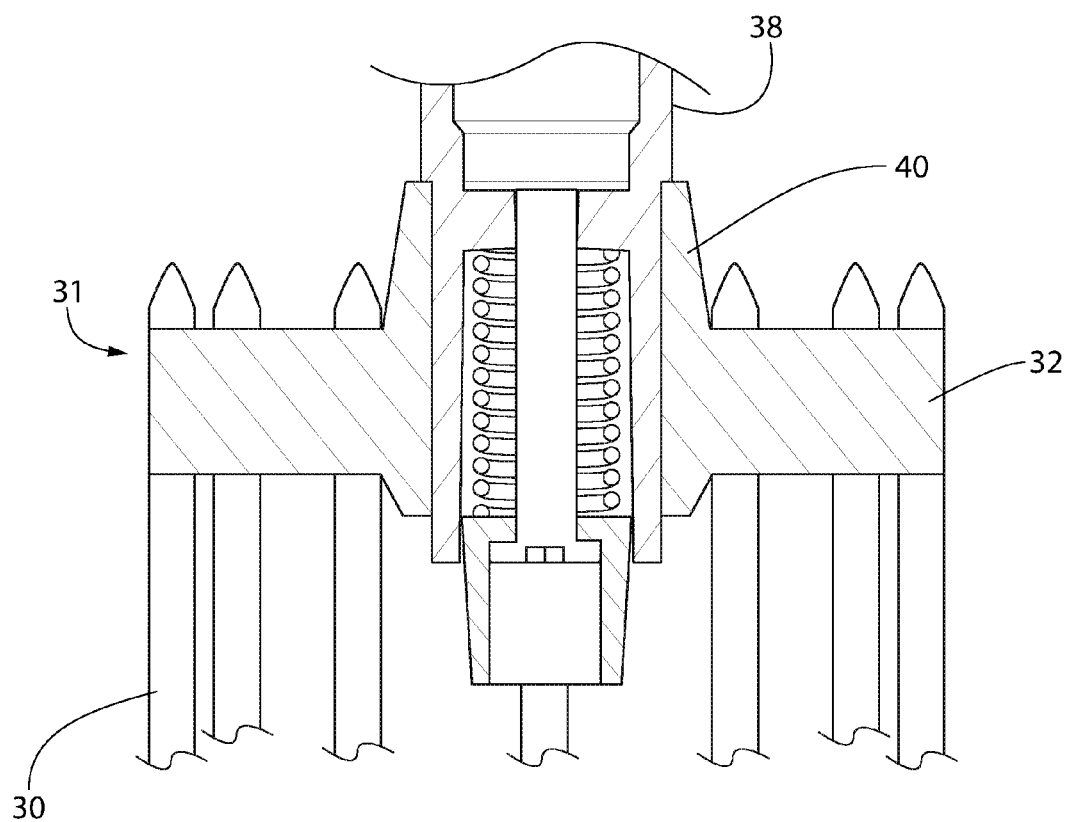
FIG. 4 is partial cross sectional side view of a control rod assembly mounted in the reactor of FIG. 1.
Figure 5:
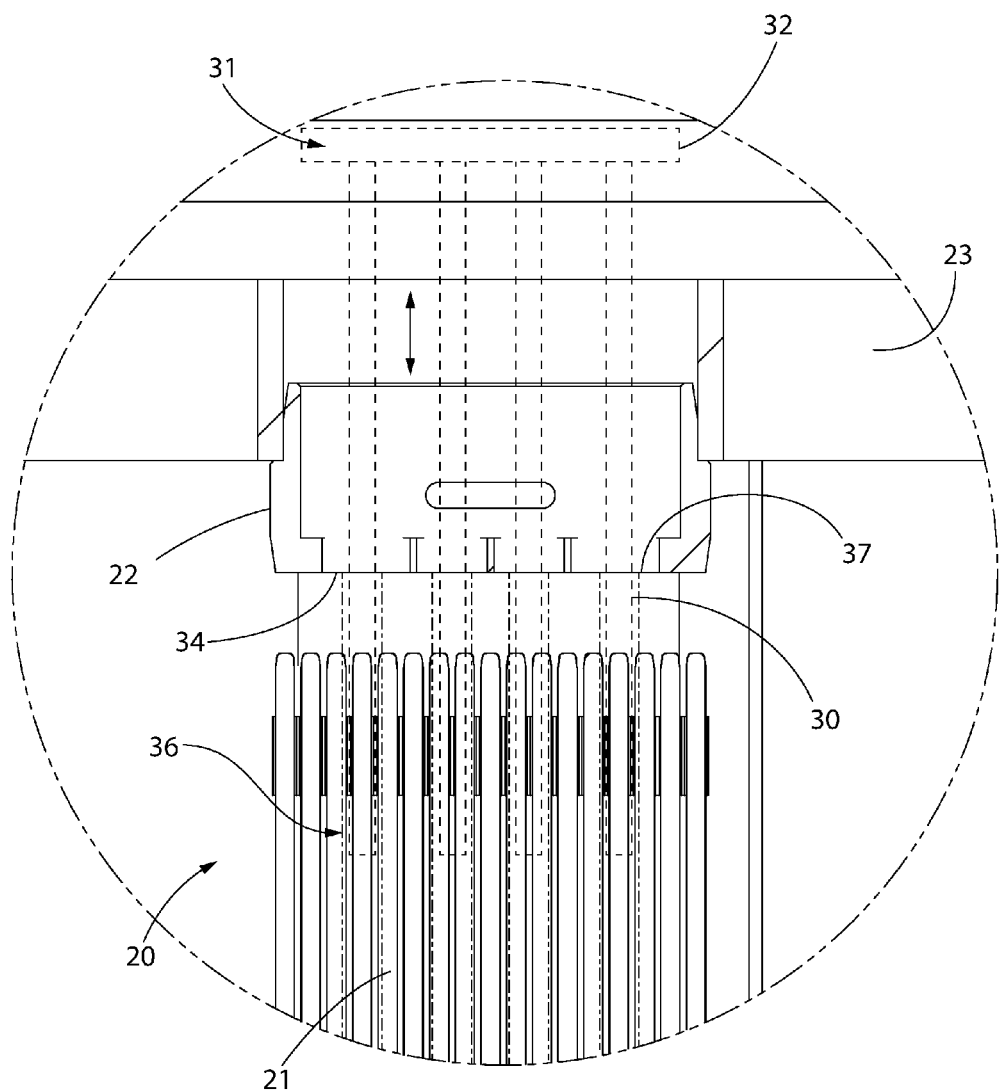
FIG. 5 is an enlarged partial cross sectional detail of the top portion of the fuel assembly showing the control rod assembly installed in the fuel core.
Figure 6:
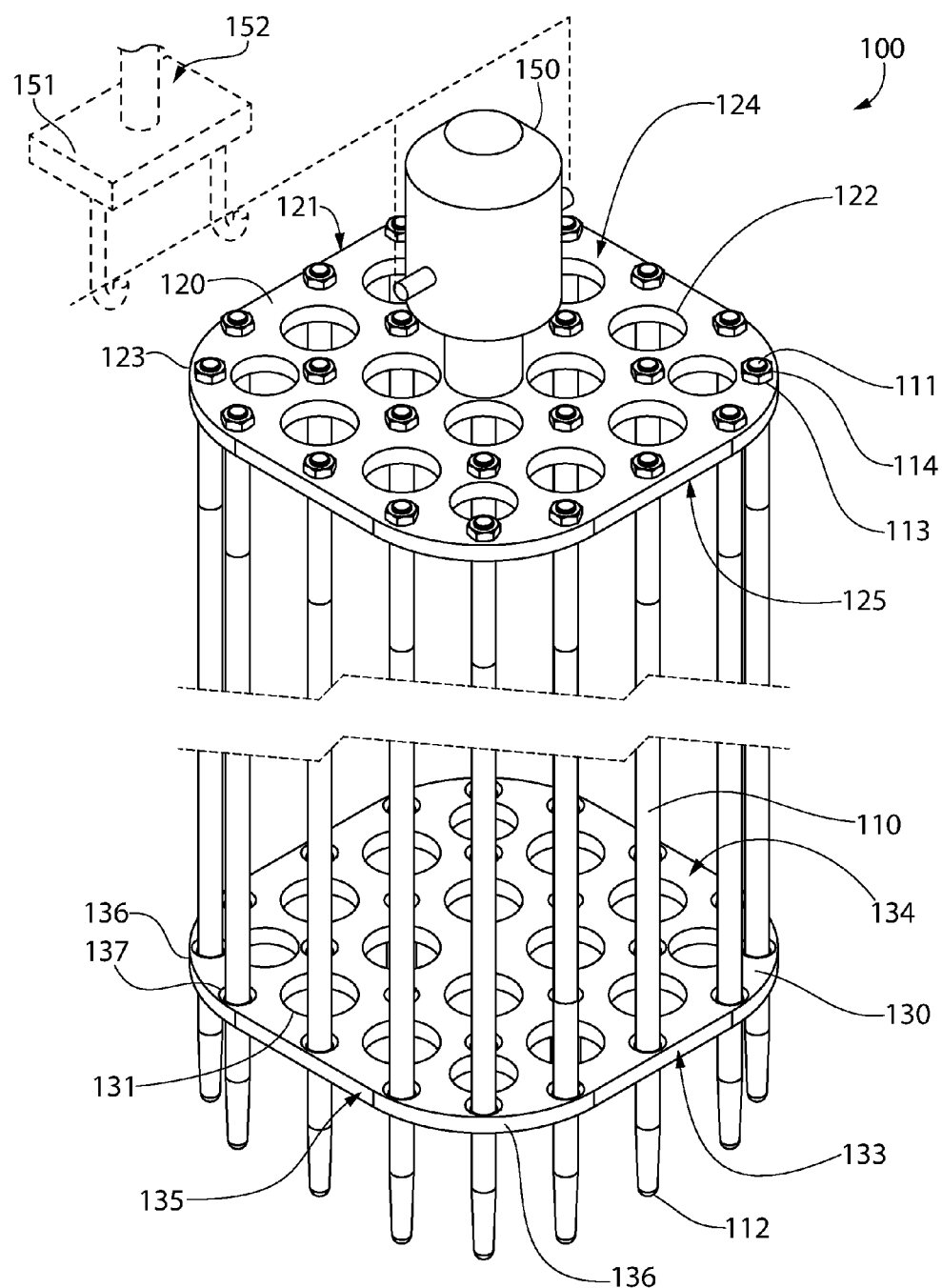
FIG. 6 is a perspective view of a reactivity control device for controlling reactivity of the fuel assembly when removed and stored remotely from the reactor vessel.
Figure 7:
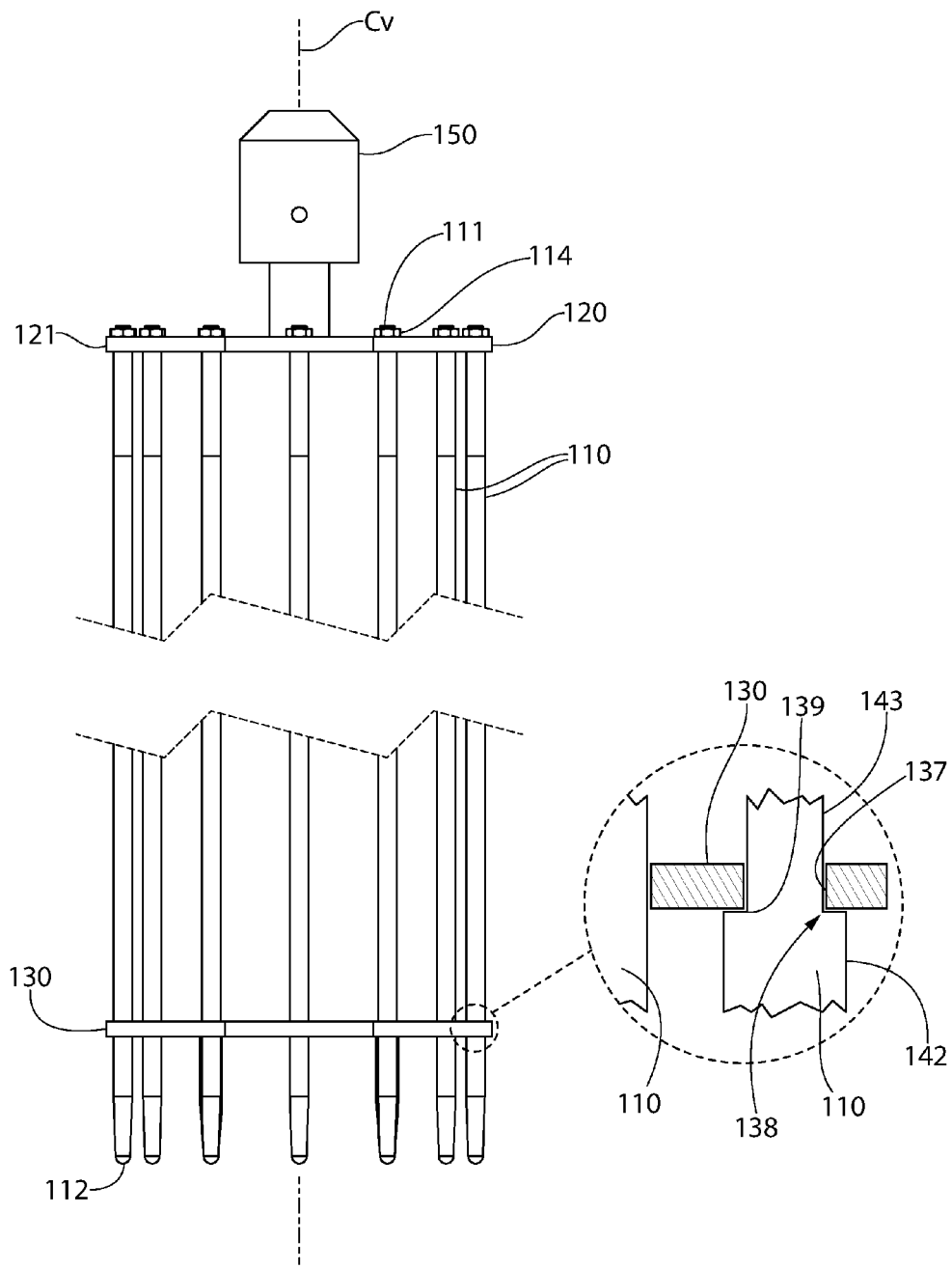
FIG. 7 is a side view thereof.

The nuclear fuel assemblies 20 may each include their own individual dedicated control rod assembly that supports a cluster of the reactor's control rods 30, best shown in FIGS. 4 and 5. The control rod assemblies may be referred to as a rod cluster control assembly (RCCA) 31 which is mounted inside the reactor vessel 2 with the nuclear fuel core 23. The RCCAs remain with the reactor vessel as part of the reactor's motorized control rod drive system 32 when swapping out fuel assemblies from the fuel core 23 (i.e. removing spent fuel assemblies and installing fresh fuel assemblies). The RCCA 31 is operably coupled to the control rod drive system 32 and mounted above the fuel assemblies 20 when positioned in the reactor fuel core 23 inside the reactor vessel 25. The drive system 32 generally includes a drive rod 33 operably coupled to a suitable type and capacity motor 42 mounted proximally above the top of the reactor vessel 25 which operates to raise and lower the drive rod and RCCA 31. Drive rod 33 has a lower end grapple or coupling 39 detachably coupled to a drive rod extension 38. The drive rod extension in turn is detachably coupled to the distally located RCCA 31 positioned at the top of the fuel assembly 20 (see, e.g. FIG. 5). During a SCRAM (emergency shutdown procedure of the reactor in which control rods are quickly dropped and inserted into the fuel core to suppress the nuclear reaction), the RCCA 31 is automatically uncoupled from and released from the drive rod extension 38. A drive rod extension support structure 41 (DRESS) positioned between the fuel assembly 20 and drive rod 33 supports and guides the drive rod extension 38 for upward/downward movement. To accommodate multiple fuel assemblies 20 which comprise the core 23, the DRESS 41 is formed by a plurality of tightly packed tubes in which the drive rod extensions 38 travel and structural support members. In practice, each reactor includes a plurality of drive rods, drive rod extensions, and RCCAs 31 to service the multiple fuel assemblies in each fuel core for controlling reactivity. One non-limiting example of such a control rod drive system and related components is described in commonly owned co-pending U.S. patent application Ser. No. 14/417,628 filed Jan. 27, 2015, which is incorporated herein by reference.

Each RCCA 31 comprises a control rod support plate 32 to which is mounted the plurality of control rods 30 supported by the plate. The support plate 32 has a specially configured and machined forged central hub 40 which detachably couples to the bottom end coupling mechanism of the drive rod extension 38. The control rods 30 are arranged on the support plate 32 in a pattern which coincides with the geometric layout of the control rod guide tube penetrations 34 and guide tubes 36 formed in the top flow nozzle box 22 (see FIGS. 5 and 10).

The foregoing rod cluster control assemblies (RCCA) 31 act to control the nuclear reactivity of the fuel assemblies 20 when loaded in the reactor vessel fuel core 23. However, the RCCA's 31 which support the reactor's control absorber rods 30 remain with the reactor when a spent (exhausted) fuel assembly 20 is eventually removed and temporarily stored in either the water-impounded spent fuel pool 60 (wet storage) within the reactor containment enclosure structure, or thereafter when removed from the pool and loaded into a multi-purpose canister (MPC) for dry transport and/or interim on-site storage of the spent fuel. As discussed in the Background above, the tightly-packed fuel storage cells defined by the fuel baskets in the canisters have limited neutron absorption abilities which alone cannot satisfy the NRC's criticality requirements.

In order to extend the duration of the spent fuel assemblies storage time in the fuel pool, neutron absorbing materials may be added to the fuel assemblies. Although reactor control component assemblies 31 (RCCAs) offer a possible solution to control criticality levels in the pool, this approach is not practical from an economic standpoint. A RCCA is a precisely machined steel plate with attached tubes filled with boron carbide pellets. The RCCAs are very expensive components with specially configured forged machined hubs 40 and other appurtenances, which are intended and designed to be used in the reactor core of the reactor vessel to control criticality. This also makes RCCAs impractical for use with spent fuel assemblies transported or stored in multi-purpose canisters to control criticality.

To address the criticality issue with storing and transporting spent fuel assemblies in a manner which meets the NRC's sub-criticality criterion without reliance on boron credits, a reactivity control device 100 is disclosed herein. The device is especially adapted and designed for use with spent fuel assemblies held in the reactor's spent fuel pool outside the confines of the reactor vessel 25, and may remain with the fuel assembly when loaded into a multi-purpose canister thereafter. Advantageously, the reactivity control device offers a more economic alternative in terms of capital cost than using the more expensive specialty RCCAs.

Reactivity control device 100 ("HI-SERT") exploits the vacant tubular spaces inside the fuel assembly 20 formed by guide tubes 36 (described above) after the fuel assemblies are removed from the reactor vessel 25. Referring to FIGS. 6-13, reactivity control device 100 comprises an assemblage of parallel vertically elongated neutron absorber rods 110 dimensioned to fit in the guide tubes 36 of the fuel assembly. Absorber rods 110 are cylindrically shaped elements including a fixed top end 111 and opposing free bottom end 112. The bottom ends 112 may be tapered as shown to facilitate insertion into the guide tubes 36 via a lifting tool 152 such as a long-handled tool or a motorized hoist 151 (shown schematically in FIG. 6) often employed with a fuel assembly handling and transport mechanism used with a spent fuel pool. The hoist 151 may be movably mounted to the reactor vessel enclosure structure (e.g. a monorail) or a maneuverable crane.

The absorber rods 110 may be comprised of a solid ductile neutron-absorbing material or alternatively a hollow alloy tube (e.g. stainless steel, etc.) in which a neutron absorber material is installed. The neutron absorber material may be comprised of boron, silver, indium, cadmium, and other materials capable of absorbing neutrons. If a tube is used to form the absorber rod, each tube is preferably plugged at both ends to contain the neutron absorber material. However, small holes may be provided at the top and/or bottom of the sealed tubes to extract the moisture from inside the tube (while drying the fuel assembly canister subsequent to fuel loading in the wet spent fuel pool 60 shown in FIG. 14) that would infiltrate the tubes interior during its residence in the fuel pool and to prevent pressure build-up during storage in a dry canister environment.

The top ends 111 of the neutron absorber rods 110 are rigidly and immovably connected to a suitably machined top support structure such as fixed top tube sheet 120 which ensures that the absorber rods are supported and precisely align with the locations of the recipient guide tubes 36 in the fuel assembly 20 accessed through penetrations 34 in the floor plate 37 of the top nozzle box 22 (best shown in FIG. 10 depicting some but not all of the penetrations for clarity). Top tube sheet 120 includes a top surface 124, bottom surface 125, and plurality of straight lateral peripheral edges 121 extending between the top and bottom surfaces that forms a perimeter of the tube sheet. Suitably configured flow apertures 122 (e.g. round, etc.) may be formed in tube sheet 120 to allow pool water heated by waste decay heat from the radioactive fuel rods in the fuel assembly 20 to rise and flow upwards from the assembly through the sheet which promotes natural circulation of the water in the spent fuel pool

60, and for drainage when removing the reactivity control device 100 from the fuel assembly in the spend fuel pool 60.

Figure 8:
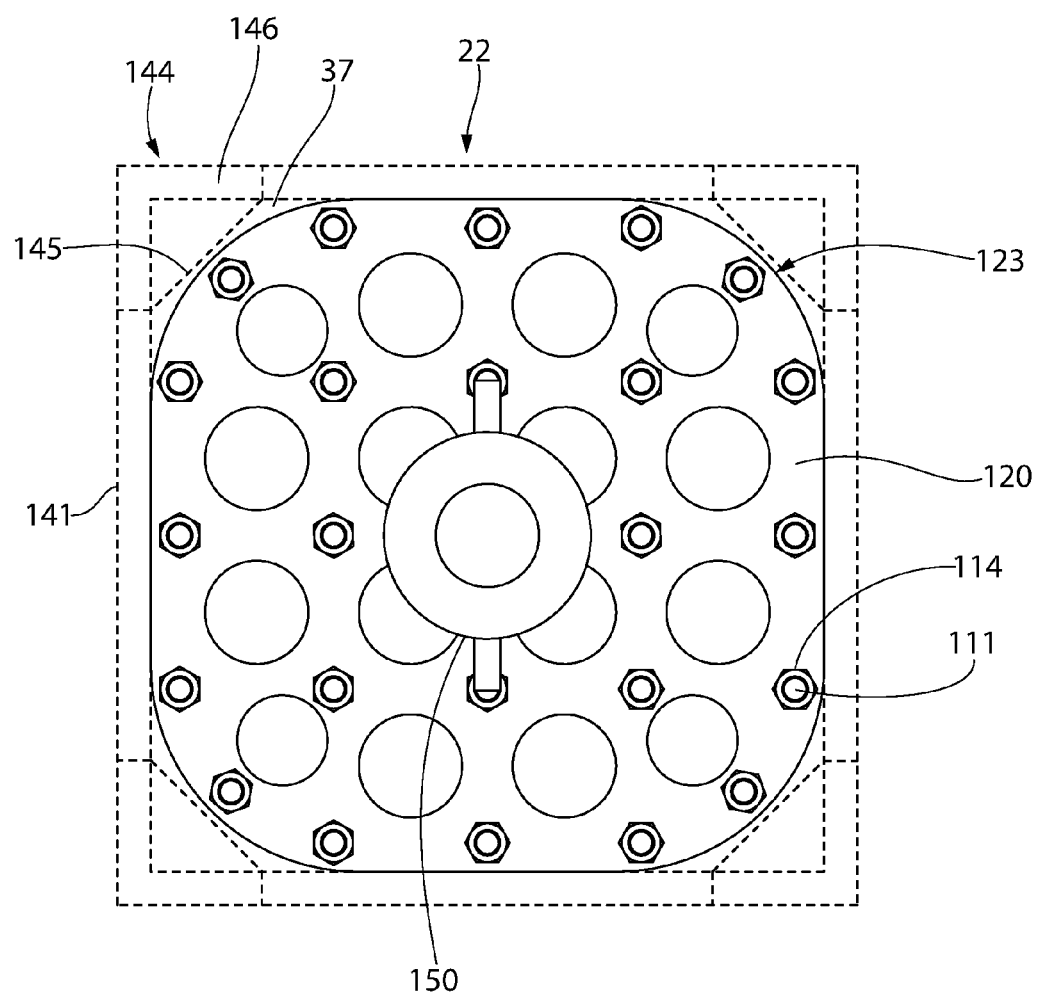
FIG. 8 is a top plan view thereof.

Top tube sheet 120 may be substantially rectilinear in top plan view in some embodiments (see FIG. 8). One example of a non-limiting embodiment may include radiused arcuately-shaped or rounded corners 123 formed between adjoining pairs of each of the four peripheral edges 121. The peripheral edges 121 may be substantially straight and arranged orthogonally (i.e. perpendicular) to each other. The rounded corners facilitate insertion of the top tube sheet 120 into an upwardly open top recess 140 formed at the upper end of the top nozzle box 22 of the fuel assembly 20 between the floor plate 37 and top of the box (see, e.g. FIG. 10), as further explained below. Top tube sheet 120 is configured and dimensioned to fit inside the recess 140. The rounded corners 123 may have a relatively large radius such that the corner regions occupy about one-quarter to one-third of the length of each lateral peripheral edge 121 as shown. Other suitable corner configurations such as angled corners comprising a straight linear edge arranged obliquely to the peripheral edges 121 may also be used.

In embodiments using solid neutron-absorber rods 110 describe above, the top ends 111 of the rods may be threaded and secured to the top tube sheet 120 via mounting holes 113 in the sheet and threaded nuts 114. In other embodiments using hollow tubular absorber rods 110 described above, the rods may be secured to the top tube sheet 120 by expansion and edge welding in the manner of a typical heat exchanger tube sheet joint. Other suitable methods of joining may be used such as those described in Chapter 7 of the book, "Mechanical Design of Heat Exchangers" By K. P. Singh, et al., (1984) or other forms of robust attachment to fixedly secure the absorber rods 110 to the top tube sheet.

A lifting coupling element 150 may be disposed on or in the top tube sheet 120 for handling the reactivity control device 100 via a long-handled gripping tool or hoist; both of which allow plant operating/maintenance personnel to install/remove the reactivity control device from a safe remote location to minimize radiation exposure to the fuel assembly. Any suitable configuration of coupling element 150 may be used which is configured to be detachably engaged by the particular type of lifting tool 152 employed for handling the reactivity control device. Some non-limiting examples of coupling element 150 configurations that may be used include without limitation threaded sockets, quick connect couplings, lifting protrusion with lifting pins or flanges, etc.).

In order to facilitate insertion of reactivity control device 100 into the fuel assembly 20 when handling the reactivity control device 100 remotely with a long-handled tool or hoist 151, a lower floating guide plate 130 is provided. Unlike the top tube sheet 120, the guide plate 130 by contrast is slideably mounted on the absorber rods 110 for upward/downward movement thereon. In one embodiment, the guide plate 130 has the same configuration and dimensions as the top tube sheet 120 in top plan view.

With continuing reference to FIGS. 6-13, the floating guide plate 130 includes a top surface 134, bottom surface 133, and plurality of straight lateral peripheral edges 135 extending between the top and bottom surfaces that forms a perimeter of the plate. The floating guide plate 130 includes machined rod guide holes 137 which slideably receive the absorber rods 110 therethrough and allow the plate to slide and travel upwards and downwards along a majority of the length of the absorber rods. Preferably, in one embodiment, the guide plate 130 is slideably movable on the absorber rod array between an uninstalled lower position proximate to the bottom ends 112 of the rods 110 (see, e.g. FIGS. 6 and 7) and an installed upper position abuttingly engaging the underside of the top tube sheet 120 (see, e.g. FIG. 13). The locations of the floating guide plate holes 137 precisely correspond to the fuel assembly's guide tubes 36 and corresponding guide tube penetrations 34 layout/pattern in fuel assembly's upper end structure (e.g. top nozzle box). This vertically aligns each of the absorber rods 110 with a mating one of the fuel assembly's guide tubes 36 for insertion therein. Accordingly, in plan view, the pattern of the absorber rod 110 array (see, e.g. FIG. 9) is preferably identical to the pattern of the guide tubes 36 and penetrations 34 in the fuel assembly 20.

To prevent the floating guide plate 130 from sliding off the absorber rod array, the guide plate is captured proximate to the bottom ends 112 of the rods by one or more end stops 138 formed on the lower extremity of the absorber rod array on reactivity control device 100. The end stops 138 are preferably disposed on the absorber rod array proximate to but spaced vertically a short distance above the bottom ends 112 of the absorber rods so that the rods extend and protrude downwards below the guide plate 130 as shown. This allows the bottom ends 112 of the absorber rods to be inserted through the guide tube penetrations 36 in the top nozzle box 22 of the fuel assembly 20 without interference from the guide plate. Preferably, the height and location of the end stops is selected close enough to the bottom of the absorber rod array to prevent excessive radial inward/outward splaying or displacement of the free bottom ends 112 of the absorber rods 110 which might otherwise interfere with the precise alignment of the rod ends with their corresponding guide tube penetration 34 in the fuel assembly top nozzle box 22 necessary for insertion into the fuel assembly guide tubes 36. Accordingly, the floating guide plate 130 serves an important function of maintaining the absorber rod 110 pattern (see, e.g. bottom plan view of FIG. 9) at the bottom of the rod array distally from the top tube sheet 120 that supports the plate. This ensures to precise alignment of the absorber rods 110 with the plurality of guide tube penetrations in the floor plate 37 of the top nozzle box 22.

The end stops 138 may be formed and configured in various ways to retain the guide plate 130 on the array of absorber rods 110. In one embodiment shown in FIG. 7, the end stops 138 may be formed by a necked down or reduced diameter upper portion 143 formed preferably on at least two or more outboard absorber rods 110 at diametrically opposite sides of the absorber rod array (e.g. near corners 136 in one non-limiting example). The diameter of the mating rod guide holes 137 for the end stop absorber rods 110 with reduced diameter upper portion 143 is correspondingly smaller than the guide holes which slideably receive the remaining full diameter absorber rods 110 in the array. The end stop absorber rods 110 have a full diameter lower portion 142 extending from the reduced diameter upper portion 143 below the floating guide plate 130 towards the bottom ends 112 of the rods (except for tapered rod ends if provided). The transition between the reduced diameter upper portion 143 of each end stop absorber rods 110 and full diameter lower portion 142 define a stepped shoulder 139 that engages and captures the guide plate 130, thereby defining the end stop 138 that retains the plate on the absorber rod array (see FIG. 7 enlarged cross sectional detail). The smaller mounting hole 137 for the end stop absorber rods 110 has a diameter smaller than the outside diameter of the full diameter absorber rods to capture the floating guide plate 130. Preferably, the reduced diameter portion 143 of the end stop absorber rods 110 extends upwards for sufficient distance on each rod so that the floating guide plate 130 may form an abutting relationship with the top tube sheet 120, for reasons explained below.

In other embodiments, the end stops 138 may be formed by radial protrusions extending outwards from preferably at least two absorber rods 110 at the same location described above for end stops defined by the stepped shoulder 143 on the rods. The protrusions have a length that extends for a distance beyond the diameter of the rod guide holes 137 in the floating guide plate 130 to capture the plate on the end stop absorber rods. Other possible ways of forming end stops on the absorber rods 110 are possible.

Figure 9:
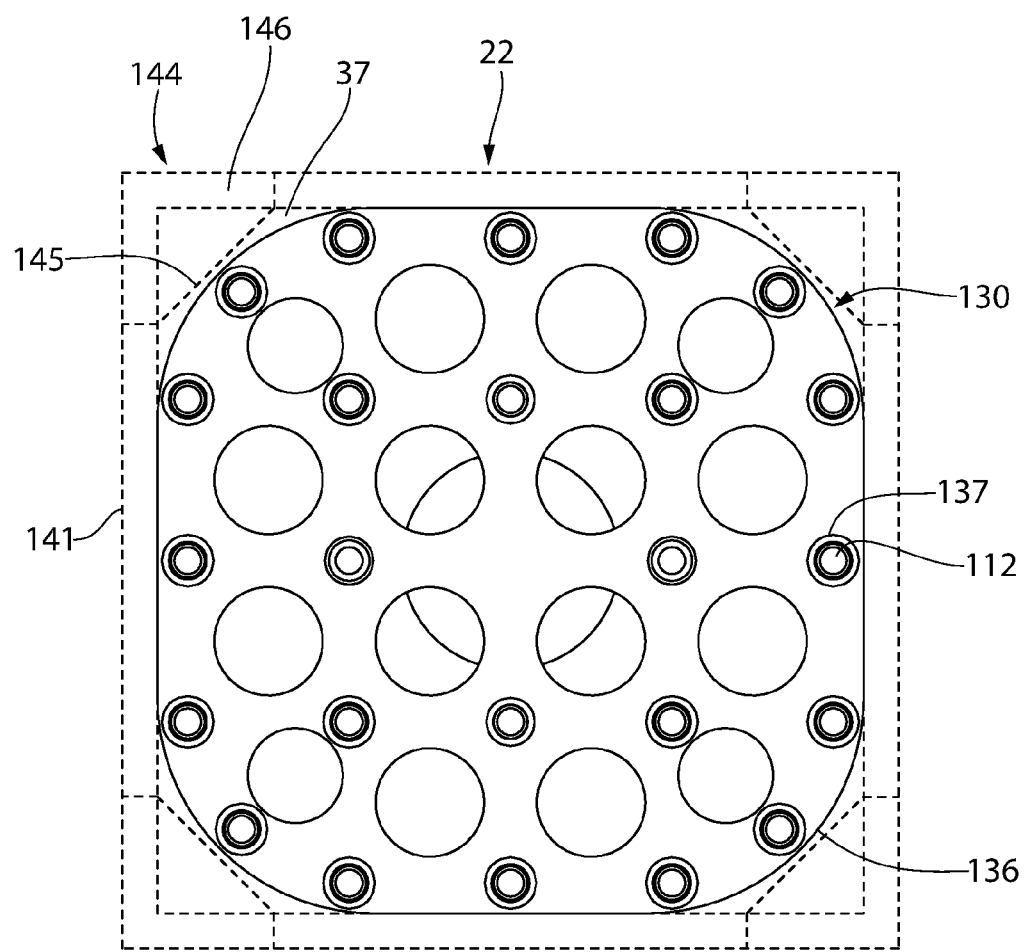
FIG. 9 is a bottom plan view thereof.

As noted above, guide plate 130 may have the same shape and dimensions as top tube sheet 120 and is therefore substantially rectilinear in top plan view (see, e.g. FIG. 9). In some embodiments, the guide plate 130 may also include the same radiused arcuately-shaped rounded corners 136 formed between each of the four peripheral edges 135 which may be substantially straight. The rounded corners 123 may have a relatively large radius such that the corner regions occupy about one-quarter to one-third of the length of each peripheral edge 121 as shown. Other corner configurations such as angled or squared corners may be used.

The radiused corners 136 ensure that that the absorber rods 110 are orientated and properly vertically aligned top nozzle box 22 for insertion into the guide tube penetrations formed in the nozzle box. The floating guide plate 130 has a complementary configuration to the upwardly open top recess 140 in the fuel assembly top nozzle box 22 (in top plan view) to therefore facilitate insertion with the proper orientation. Accordingly, in the illustrated embodiment, the guide plate 130 may only be inserted into the nozzle box top recess 140 when the peripheral edges 135 of the plate are oriented parallel to the four orthogonal straight lateral sidewalls 141 circumscribing the nozzle box floor plate 37. This locates the corners 136 of the guide plate in vertical alignment with truncated corner regions 144 of the top nozzle box 22 formed between each adjacent pair of sidewalls 141 (the same rationale applies to the rounded corners 123 of the top tube sheet 120 describe above).

Figure 13:
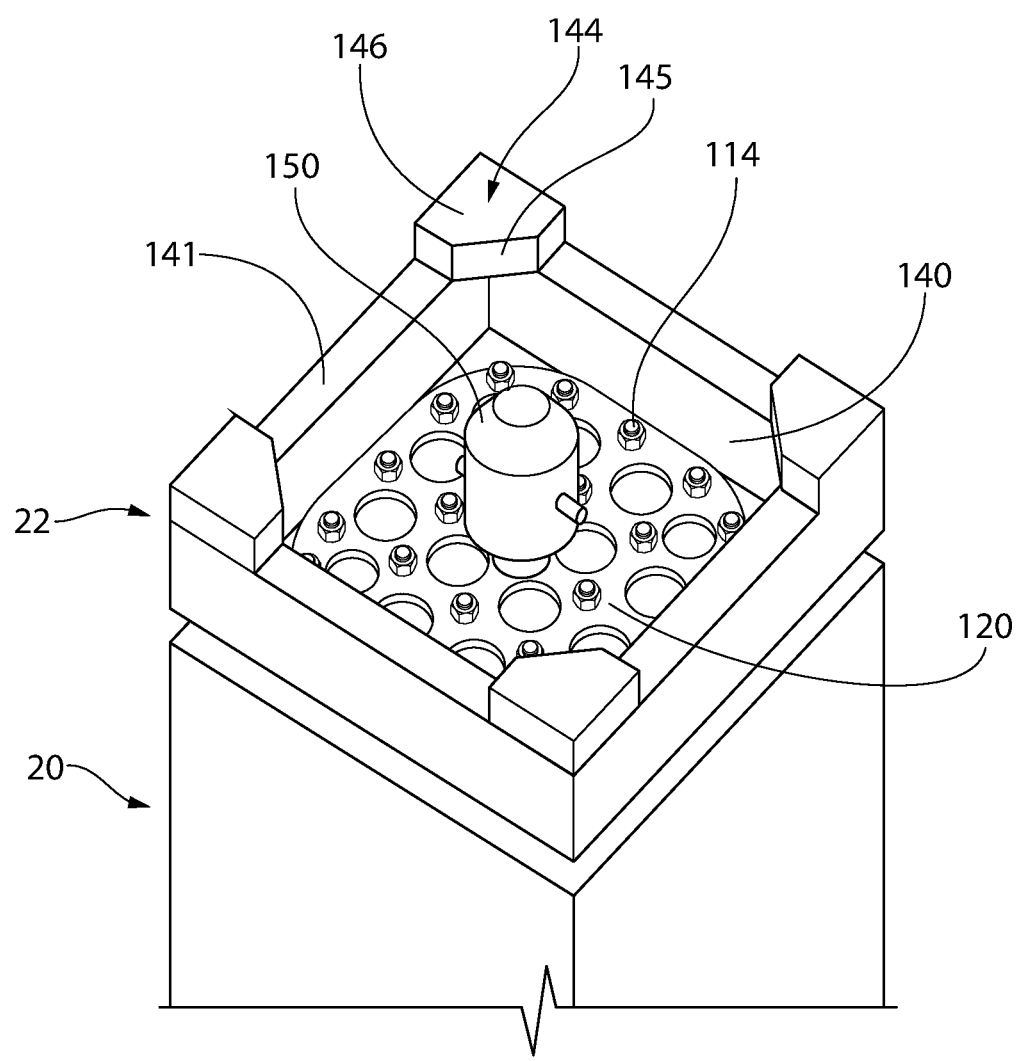

In one non-limiting embodiment, the truncated corner regions 144 of the top nozzle box 22 may be formed by inward facing angled inner corner surfaces 145 circumscribing and formed adjacent to the nozzle box top recess 140. The inner corner surfaces 145 may be flat and vertically oriented. Each angled inner corner surface 145 is oriented obliquely to the pair of adjacent straight sidewalls 141 of the top nozzle box 22 which meet at each of the corner regions. In one non-limiting embodiment illustrated, angled corner surfaces 145 may be formed on upwardly extending guide protrusions 146 formed on the top nozzle box 22 (e.g. on sidewalls 141) at each of the truncated corner regions 144. As best shown in FIGS. 8 and 13, the guide protrusions 146 extend diagonally across the sidewalls 141 in the corners of the nozzle box top recess 140 to create an effective upwardly open surface area in top plan view for receiving the top tube sheet 120 and floating guide plate 130 which is less than the actual surface area of the floor plate 37 of the top nozzle box 22 beneath the protrusions. This restricts insertion of the top tube sheet and guide plate into the nozzle box top recess 140 to a single rotational orientation of the sheet and plate with respect to the top recess.

In operation, if the corners 137 of the guide plate 130 are not vertically aligned with the truncated corner regions 144 of the top nozzle box 22, the corners 137 would catch on (i.e. engage) the tops of the sidewalls 141 or guide protrusions 146 if provided, thereby preventing full insertion of the floating guide plate 130 into the recess 140. This ensures that each of the neutron absorber rods 110 are properly aligned vertically with a corresponding guide tube penetration 34 in the nozzle floor plate 37 when the rods and guide plate 130 are being lowered into mutual engagement with the fuel assembly 20 (i.e. top nozzle box 22). Because the reactivity control device 100 is typically suspended via cables or chain from a remote hoist 151 when being inserted or withdrawn from a fuel assembly 20 submerged 25 feet or more in the water-impounded spent fuel pool 60 in a fuel storage rack 70 (see, e.g. FIGS. 14-15) or multi-purpose canister 80 in the fuel pool (see, e.g. FIGS. 16-17), the ability to easily achieve proper rotational orientation of the reactivity control device about its vertical centerline Cv with respect to the fuel assembly and its top nozzle box 22 is significant benefit when using this type of rigging arrangement. The top tube sheet 120 is rotationally oriented in the same radial position with respect to vertical centerline Cv as the lower floating guide plate 130 so have the corners 123 of the tube sheet are positioned vertically above corners 136 of the guide plate producing an identical footprint in top plan view for the same foregoing reasons.

In other possible embodiments, the truncated corner regions 144 of the fuel assembly top nozzle box 22 may have arcuately radiused or rounded inner corner surfaces 145 of similar shape to the corners 136 and 123 of the floating guide plate 130 and top tube sheet 120 instead of being obliquely angled in the illustrated embodiment. Other possible complementary and mating polygonal shape combinations (in top plan view) of the floating guide plate 130 (and top tube sheet 120) and top recess 140 of the top nozzle box 22 may be used (e.g. hexagonal, octagonal, triangular, etc.) so long as the combination of shapes selected permits insertion of the plate 130 into the top recess in one proper orientation. Preferably, the combination of shapes selected are non-circular unless other provisions are made to ensure that guide plate 130 and top tube sheet 120 can be inserted into the top nozzle box top recess 140 in a single orientation (e.g. mating radial protrusions on the plate/sheet and recesses in the top nozzle box, etc.).

The floating guide plate 130 may also include a plurality of suitably configured flow apertures 131 (e.g. round, etc.) similar to flow apertures 122 formed in the top tube sheet 120. Preferably, the flow apertures 131 and 122 are arranged in the same layout or pattern so that each flow aperture 131 is concentrically aligned with a mating flow aperture 122 when the guide plate 130 and top tube sheet 120 are abuttingly engaged when the reactivity control device 100 is fully inserted and positioned in the fuel assembly 20 when the floating guide plate is in the upper installed position. This ensures that water in the spent fuel pool 60 heated by the waste decay heat by the fuel rods in the fuel assembly 20 can flow through each pair of apertures 122, 132 in the tightly stacked top tube sheet and floating guide plate for cooling the fuel assembly. In one embodiment, therefore, the flow apertures 122 and 131 may each have the same diameter to provide unrestricted flow through the sheet and plate.

In one non-limiting construction, as an example, the materials selected for the upper structure of the fuel assembly 20 (i.e. top nozzle box 22) and guide tubes 36 in the fuel assembly may be an austenitic stainless steels (e.g., type 304, 304L, 304LN, 316, 316L, 316 LN) or a nickel alloy (e.g., Hastelloy, etc. widely used in the nuclear industry). The neutron absorber material for selected for absorber rods 110 may be a powdered or metal matrix composite containing boron carbide or elemental boron. Borated stainless steel has the advantage of being directly weldable to the top structure (thus dispensing with the sheathing tube), but its boron loading capacity is quite modest, making it a relatively weak neutron absorber. The floating guide plate 130, top tube sheet 120, and coupling element 150 may be made of similar materials as the fuel assembly top nozzle box and guide tubes, or a different material. Other materials than those examples given herein may be used.

In one non-limiting example of a reactivity control device 100 designed for use in a typical 17×17 PWR fuel assembly 20, the device may have a height of approximately 13.8 feet (4.2 meters) and width (of top tube sheet 120/floating guide plate 130) of approximately 6.5 inches (16.5 cm). The absorber rods 110 may have an outside diameter of approximately 0.3125 inches (8 mm). For comparison, the 17×17 fuel assembly has a height of approximately 14 feet (4.3 meters) and width of approximately 8.3 inches (21 cm). The guide tubes 36 have an outside diameter of approximately 1.2 inches (3.1 cm). These dimensions are representative, but not limiting.

Reactivity control device 100 is advantageously a mechanically simple, economically fabricated, and reusable device. As such, it can be used to improve the sub-criticality of the fuel while being stored in a spent fuel pool (wet storage). Once equipped with a reactivity control device 100, the reactivity of the fuel in the fuel assembly is permanently decreased making it suitable for transfer to dry storage (under 10 CFR 72 rules) and transport (under 10 CFR 71 rules) without reliance on burn-up or boron credit. Because the fuel assembly is extremely radioactive, the installation of reactivity control device preferably occurs in a fuel pool or in a hot cell by remote means. The description provided herein of the reactivity control device assumes for convenience of description and not limitation installation into a fuel assembly placed in a spent fuel pool rather than hot cell.

A non-limiting example of a method or process for controlling reactivity in a nuclear fuel assembly removed from a fuel core of a nuclear reactor will now be described. The reactivity is controlled in one embodiment using the reactivity control device 100 which may be deployed and installed using a remote handling device such as a long-handled tool or crane/hoist. FIGS. 10-13 show sequential steps in the installation process for the reactivity control device.

The fuel assembly 20 may initially be installed in the fuel core 23 of the nuclear reactor vessel 25 and used to power the heating of the primary coolant. The rod cluster control assembly (RCCA) 31 inside the reactor vessel 25 is removably inserted in the fuel assembly 20 and used to control the reactivity in a known manner. After the nuclear fuel source (i.e. uranium) has been depleted, the fuel assembly requires removal from the reactor vessel and replacement ("spent fuel assembly"). The replacement includes among other things opening the reactor vessel and removing the RCCA 31 from the fuel core. The spent fuel assembly 20 is then removed from reactor vessel 25, transported, and placed in the spent fuel pool 60 to submerge the fuel assembly (see, e.g. FIGS. 14 and 15). In one embodiment, the fuel assembly 20 may be transported to and loaded into a vacant cell 71 of a fuel storage rack 70 positioned on the bottom 64 of the pool which holds a plurality of fuel assemblies 20. A new fuel assembly 20 may be inserted into the fuel core, the same RCCA 31 (which remains with the reactor vessel) is then re-inserted into the new fuel assembly, and the reactor vessel 25 is closed. It will be appreciated that numerous other disassembly and reassembly steps are involved as known to those skilled in the art, which are omitted herein for brevity.

Referring to FIG. 10, with the fuel assembly 20 placed in the spent fuel pool 60, the reactivity control device 100 is ready to be installed. The reactivity control device is first coupled to a lifting tool 152 (e.g. long-handled tool or hoist 151) via coupling element 150 mounted on the top tube sheet 120 and raised. The reactivity control device 100 is in an upright vertical position (FIGS. 6-13) wherein the tube sheet 120 and guide plate 130 are oriented horizontally and the absorber rods 110 are oriented vertically perpendicular to the tube sheet and guide plate as shown. The top tube sheet 120 and floating guide plate 130 are spatially separated. The guide plate 130 is initially now is in the lower position proximate to the bottom ends 112 of the absorber rods 110 (see, e.g. FIGS. 6 and 7).

The installation process continues by positioning the reactivity control device 100 above the fuel assembly 20 (e.g. with hoist 151), and then lowering the reactivity control device towards the fuel assembly. The free bottom ends 112 of the absorber rods 110 first enter the top recess 140 of the top nozzle box 22 between the sidewalls 141. The absorber rods 110 are therefore partially inserted into the nozzle box of the fuel assembly 20 at this point. Once the bottom ends of the rods are captured in the recess 140 between the sidewalls 141 that extend upwards from the fuel assembly 20, it bears noting lateral movement of the absorber rod array without raising the reactivity control device 100 prevents the device from laterally wandering and moving beyond the confines of the fuel assembly which facilitate installation.

The installation process continues by angularly rotating the reactivity control device 100 about its centerline Cv until the corners 136 of the of the floating guide plate 130 are vertically aligned with the truncated corner regions 144 of the fuel assembly top nozzle box 22 and the straight peripheral edges 135 are oriented parallel to the sidewalls 141 of the fuel assembly top nozzle box 22. The floating guide plate 130 next engages the top nozzle box 22. If the desired vertical alignment is already achieved when lowering the reactivity control device 100 towards the fuel assembly 20, this step may be omitted. This alignment process is necessary to ensure each absorber rod 110 is properly positioned above and vertically aligned with a corresponding guide tube 36 in the fuel assembly.

Figure 11:
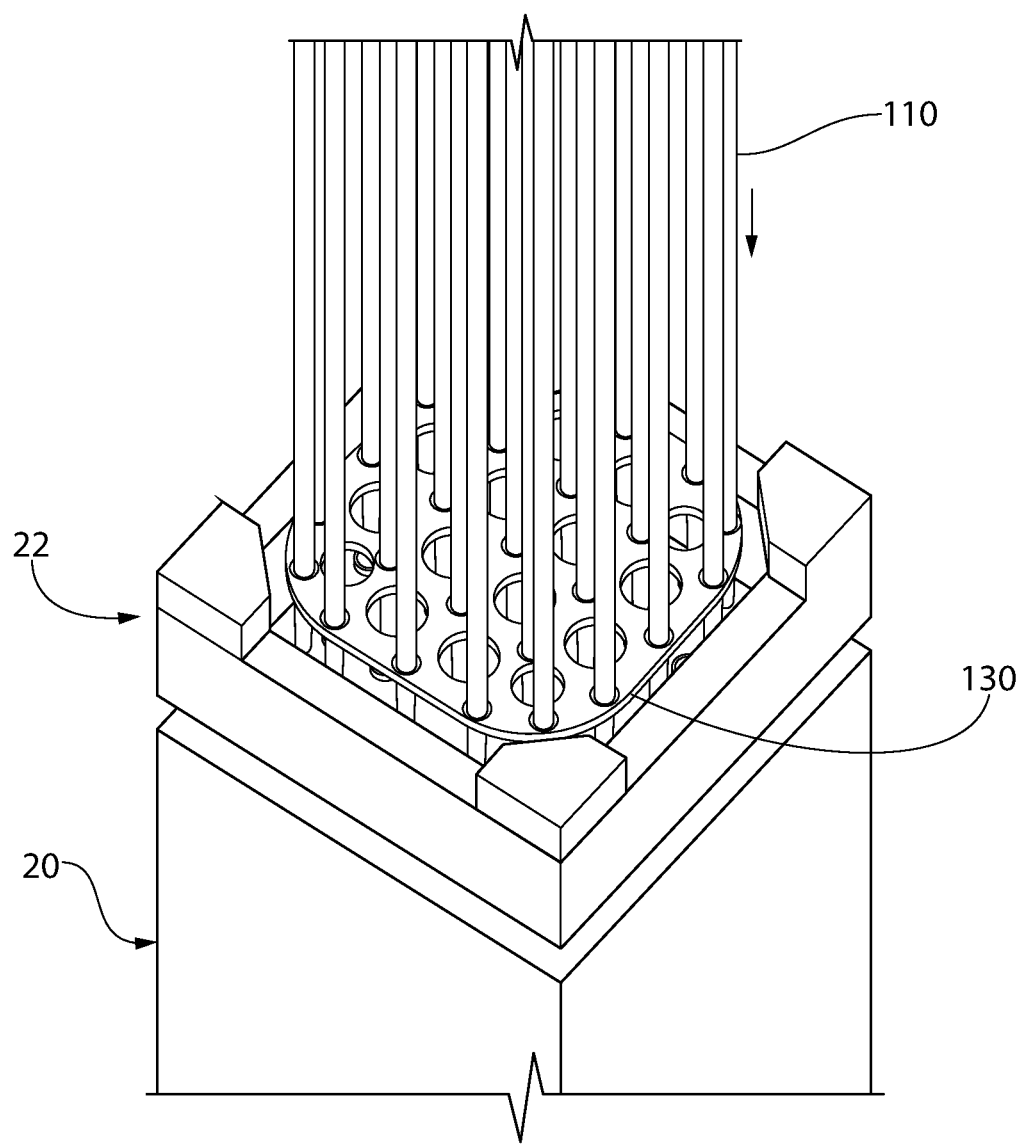

With the proper vertical alignment achieved in either case, the reactivity control device 100 is lowered farther to insert the free bottom ends 112 of the absorber rods 112 into one of the guide tube penetrations 34 in the top nozzle box 22 as shown in FIG. 11. It bears noting that if the absorber rods 110 and guide tube penetrations 34 are not properly aligned first, the bottom ends 112 will abutting engage the top floor plate 37 of the nozzle box, thereby preventing the reactivity control device 100 from being lowered any farther.

Figure 12:
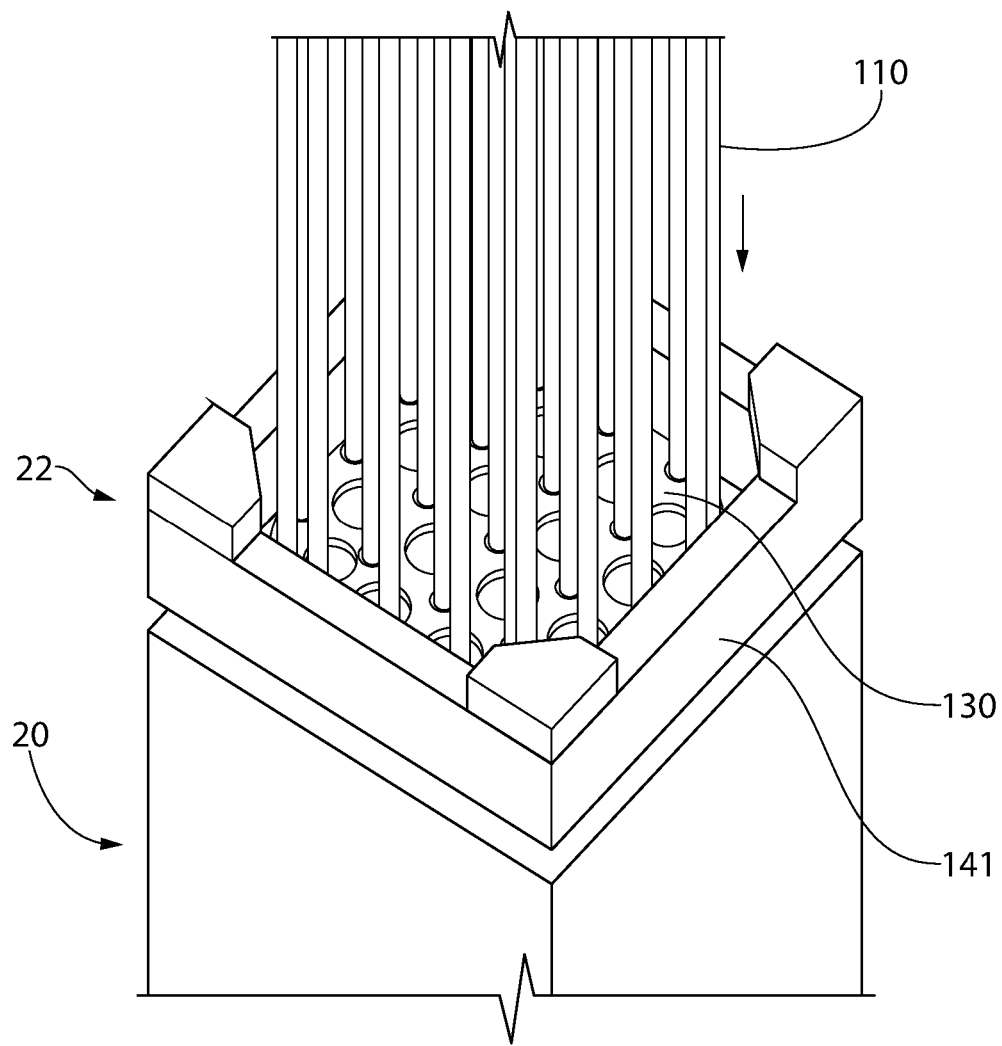

The reactivity control device 100 is then continues to be lowered still farther until the floating guide plate 130 abuttingly engages the top of the fuel assembly 20 (i.e. floor plate 37 of the top flow box 22). This is shown in FIG. 12. The guide plate 130 is nested and positioned completely within the top recess 140 of the fuel assembly and below the top edges of the sidewalls 141 and guide protrusions 146. The guide plate 130 remains stationary in this position during the remainder of the reactivity control device installation process.

The installation process proceeds by continuing to lower the reactivity control device 100 farther until the top tube sheet 120 next abuttingly engages or contacts the floating guide plate 130 within the top recess 140 of the top nozzle box 22), as shown in FIG. 13. This indicates that the reactivity control device 100 is fully installed and inserted into the fuel assembly 20 wherein the array of absorber rods 110 are correspondingly fully inserted into the fuel assembly guide tubes 36. As this occurs, the floating guide plate 130 remains in contact with the fuel assembly's top nozzle box 22 allowing the absorber rods 110 to slide and pass through the floating guide plate within guide holes 137 until the top tube sheet engages the floating guide plate. The top tube sheet 120 may also be nested and positioned completely within the top recess 140 of the fuel assembly 20 and below the top edges of the sidewalls 141 and guide protrusions 146.

Advantageously, the reactivity control device 100 nests in the fuel assembly's top nozzle box 22 in a recessed manner described above so that the fuel assembly can be handled by existing fuel assembly handling equipment (e.g. handling tools or hoists) without interference. A portion of the coupling element 150 may protrude above the top nozzle box in some embodiments to facilitate recoupling to the lifting tool 152. In other embodiments, the coupling element 150 may not extend above the top edges of the sidewalls 141 of the fuel assembly 20 and/or the guide protrusions 146. The handling tool 152 may now be uncoupled or disconnected from the coupling element 150 of the reactivity control device 100.

If the reactivity control device 100 is to be removed from the fuel assembly 20 for some reason, the floating guide plate 130 will slide down along the absorber rods 110 as the top tube sheet 120 disengages and spatially separates from the guide plate as the device is raised. The guide plate 130 continues to slide down along the absorber rod array until it comes in contact with the end stops 138 on the rods (see, e.g. FIG. 7). The reactivity control device 100 is lifted completely out of the fuel assembly while advantageously maintaining all of the absorber rods 110 in the correct orientation and pattern for reinstallation into another fuel assembly.

It is evident from the foregoing that the multiple reactivity control assemblies 100 can be utilized in parallel each covering all of the guide tubes 36 of each spent fuel assembly 20. Although it may be possible to install individual single absorber rods into each guide tube, this approach is not practical because of the difficulty of installation encountered if attempting to insert a rod (solid or tubular) remotely some 25 feet underwater in the spent fuel pool 60. This tantamount to threading a needle from a remote location. By contrast, a single reactivity control device 100 having multiple absorber rods 110, however, is advantageously far more operator-friendly and less time intensive with the added benefit of providing far better visual verification of presence of a rod in each guide tube of the fuel assembly.

Figure 14:
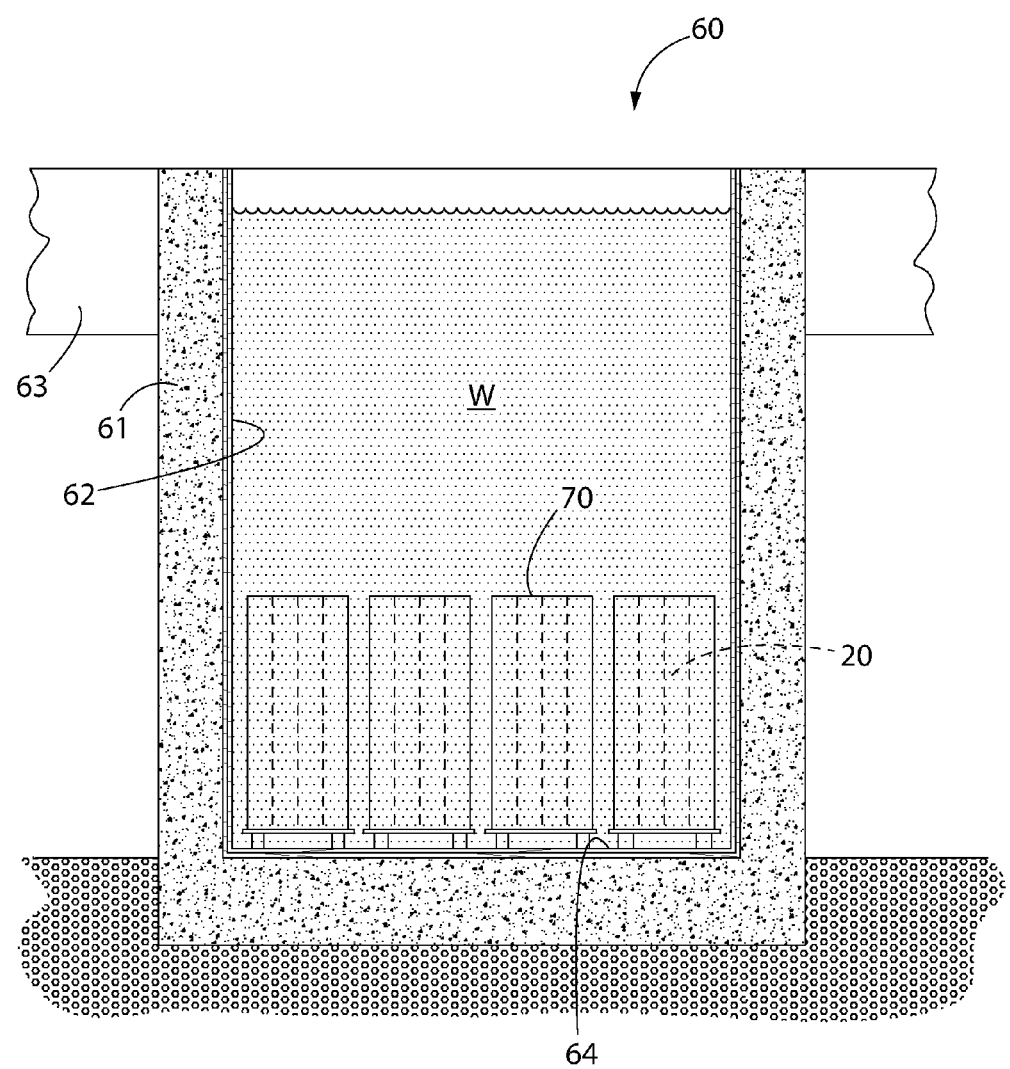
FIG. 14 is a side cross sectional view of a spent fuel pool comprising fuel storage racks holding spent fuel assembly each including a reactivity control device installed therein for wet storage of spent fuel assemblies.
Figure 15:
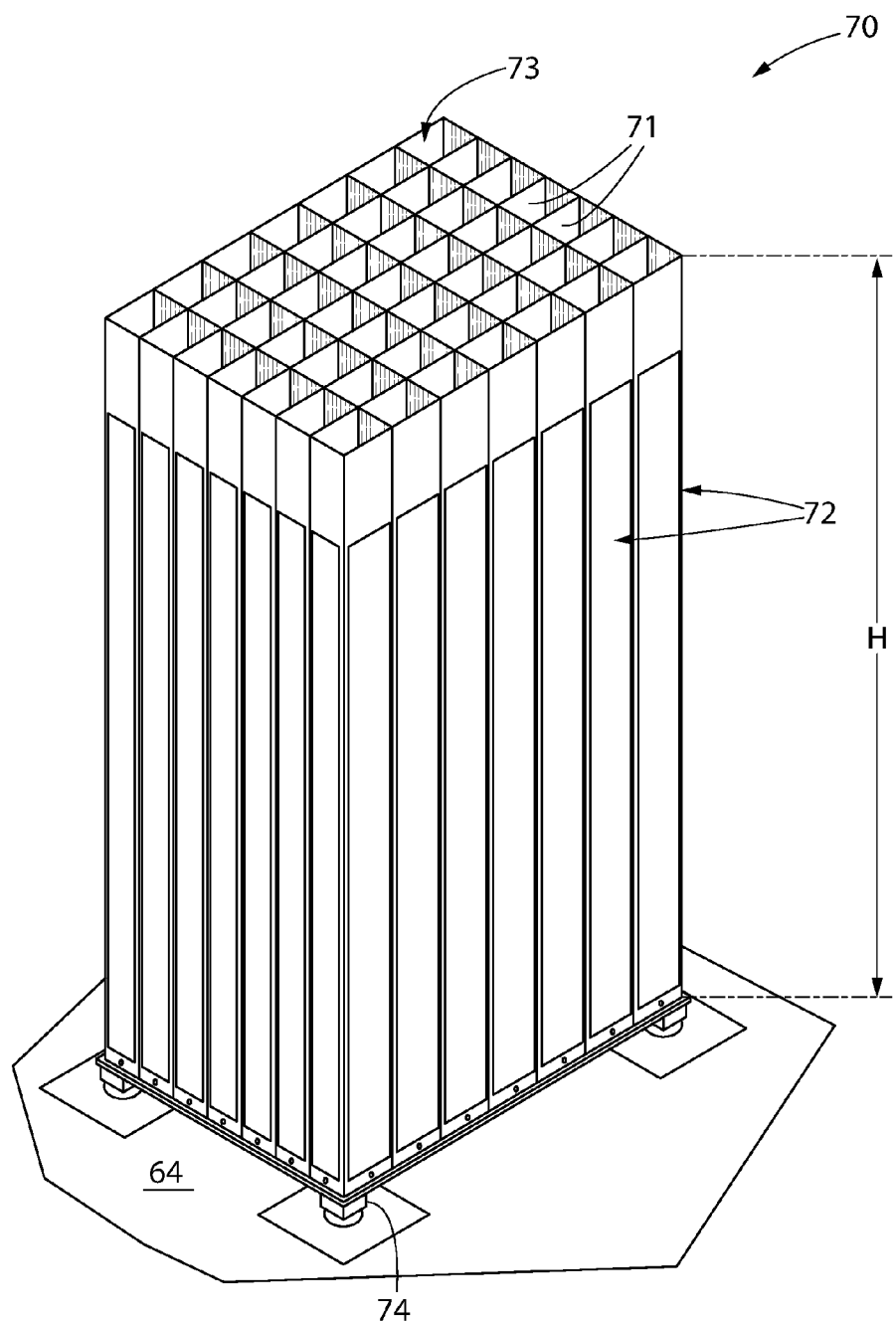
FIG. 15 is a perspective view of one of the fuel storage racks of FIG. 14.

FIGS. 14 and 15 depict a spent fool pool 60 such as the type which may be used to temporarily store spent fuel assembles 20. The pool includes a plurality of vertical sidewalls 61 and adjoining bottom floor 64 which define a cavity 62 that holds water W for submerging the fuel assemblies. One or more submerged fuel storage racks 70 rest on the bottom floor 62 which are configured to hold a plurality of fuel assemblies 20. Each rack generally comprises a grid array of closely packed open compartments or cells 71 defined by a plurality of adjacent tightly packed and parallel elongated tubes 72 having a height H sufficient to hold a fuel assembly. The tubes have open tops 73 providing access to the cells 71 which are configured and dimensioned for inserting and storing a single fuel assembly 20 in each. Each cell 71 may include bottom openings (not shown) which allows water W to infiltrate and circulate around each fuel assembly to remote waste decay heat generated by the fuel rods therein. The fuel assemblies 20 in the storage rack 70 may each include a reactivity control device 100 disposed therein as described herein. Fuel storage racks are further described in commonly assigned U.S. patent application Ser. No. 14/367,705 filed Jun. 20, 2014, which is incorporated herein by reference.

Figure 16:
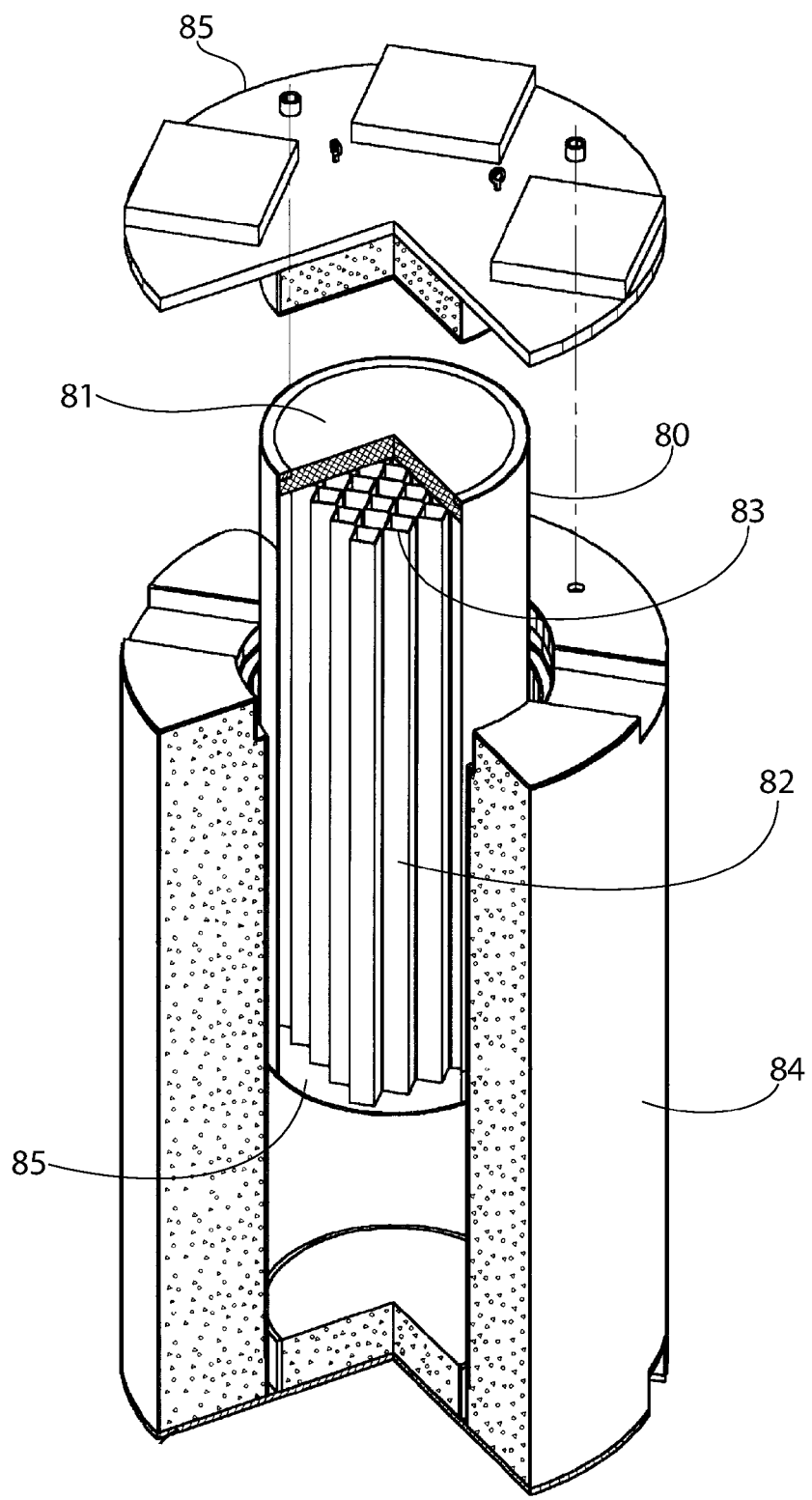
FIG. 16 is an exploded perspective view showing a multi-purpose canister and overpack for wet storage of spent fuel assemblies.
Figure 17:
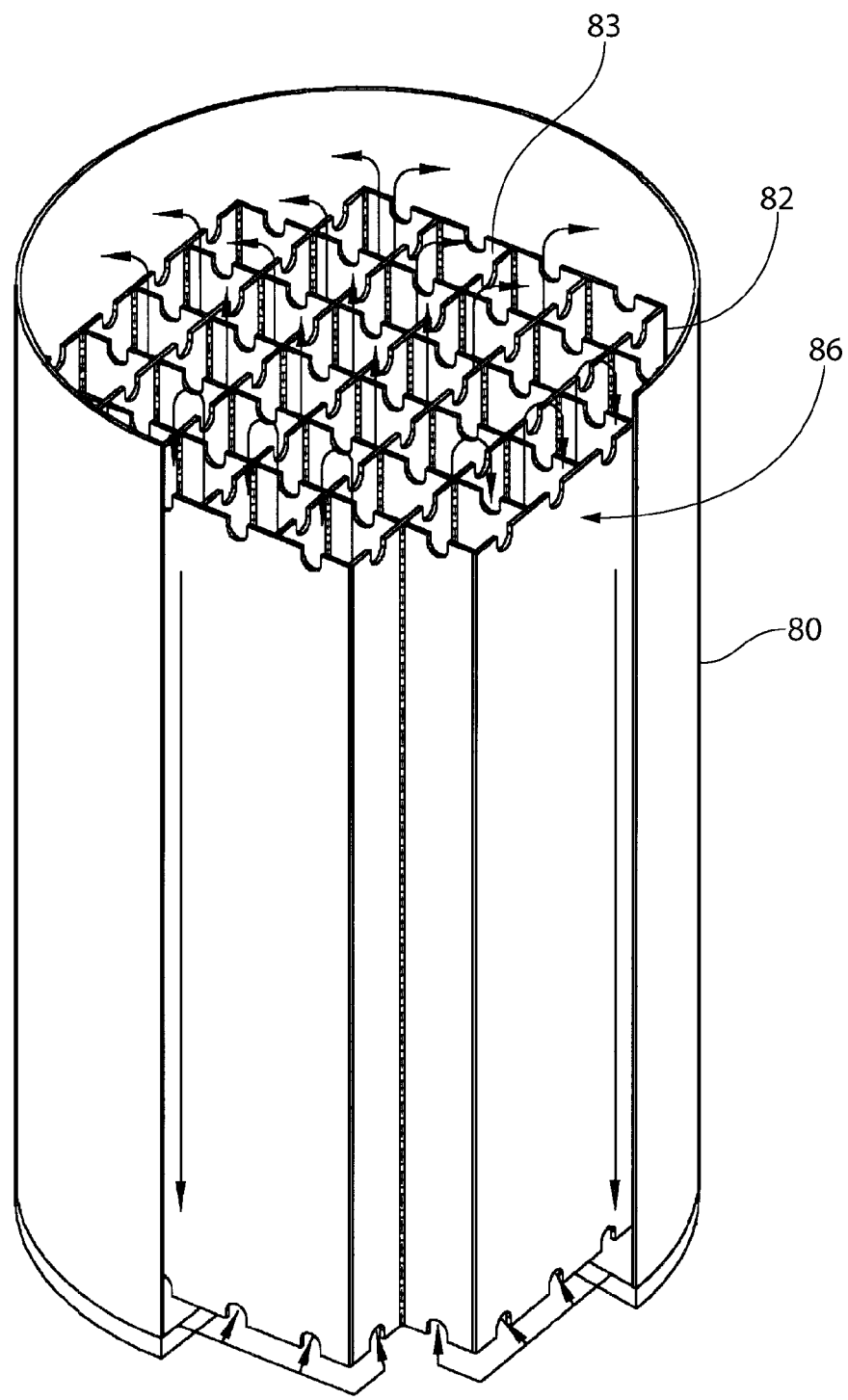
FIG. 17 is a perspective view of the multi-purpose canister of FIG. 16.

The fuel assemblies 20 with inserted reactivity control device 100 may be transferred to and stored a multi-purpose canister 80, a non-limiting example of which is shown in FIGS. 16 and 17. Canister 80 generally comprises a cylindrical shell, baseplate 85, and sealable/weldable lid 81 which form the confinement boundary for the stored fuel assemblies. The confinement boundary may be a seal-welded enclosure of all stainless steel construction. The canister includes a fuel basket 86 which has composite cell structure having a rectilinear honeycomb construction formed by a plurality of tightly packed elongated tubes 82 forming open top elongated cells 83 each configured and dimensioned to hold a single fuel assembly 20. The fuel assemblies 20 may be transferred from the fuel storage rack 70 to the canister 80 underwater while submerged in the spent fuel pool 60 to minimize radiation levels. Multi-purpose canisters are further described in commonly assigned U.S. Pat. Nos. 7,096,600 and 5,898,747, which are incorporated herein by reference.

When loaded, the multi-purpose canisters 80 may be removed from the spent fuel pool 60, dried using inert gases and vacuum in a manner known in the art, and transferred to an outer transport or storage 84 with a sealable lid 85 (e.g. "overpack").

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A reactivity control device for storing nuclear fuel, the device comprising:
    a top tube sheet;
    an array comprising a plurality of vertically elongated neutron absorber rods fixedly attached to the top tube sheet, the absorber rods arranged parallel to each other; and
    a floating guide plate slideably mounted on the absorber rods for upward and downward movement along the absorber rods, the floating guide plate movable between a lower position proximate to bottom ends of the absorber rods and an upper position abuttingly engaging the top tube sheet.

2. The reactivity control device according to claim 1, wherein the top tube sheet and floating guide plate have the same shape in top plan view.

3. The reactivity control device according to claim 1, wherein the floating guide plate has a substantially rectilinear shape in top plan view including a plurality of straight lateral peripheral edges and arcuately rounded corners formed between adjoining peripheral edges.

4. The reactivity control device according to claim 3, wherein the top tube sheet has a substantially rectilinear shape in top plan view including a plurality of straight lateral peripheral edges and arcuately rounded corners formed between adjoining peripheral edges.

5. The reactivity control device according to claim 1, wherein the floating guide plate includes guide holes which slideably receive the absorber rods therethrough and allow the plate to slide upwards and downwards along a length of the absorber rods.

6. The reactivity control device according to claim 1, wherein the top tube sheet and floating guide plate each include a plurality of flow apertures, each flow aperture in the top tube sheet being concentrically aligned with a corresponding flow aperture in the floating guide plate.

7. The reactivity control device according to claim 1, wherein the absorber rods each comprise a solid ductile neutron-absorbing material or a hollow ductile tube containing a neutron absorber material.

8. The reactivity control device according to claim 1, wherein the absorber rods each include a fixed top end mounted to the top tube sheet and a free bottom end.

9. The reactivity control device according to claim 8, wherein the free bottom end of each absorber rod is tapered.

10. The reactivity control device according to claim 1, further comprising at least one end stop formed on at least one absorber rod proximate to a bottom end of the at least one absorber rod, the at least one and stop engaging and preventing the floating guide plate from sliding off of the absorber rod array.

11. The reactivity control device according to claim 10, wherein the end stop is formed by a stepped shoulder formed by a reduced diameter portion of the at least one absorber rod that engages and captures the floating guide plate.

12. The reactivity control device according to claim 1, further comprising a lifting coupling element mounted on the top tube sheet for filling the reactivity control device, the coupling element configured for engagement by a lifting tool.

13. A reactivity control system for storing nuclear fuel, the system comprising:
a nuclear fuel assembly comprising a bottom nozzle box, a top nozzle box, a plurality of fuel rods extending vertically between the nozzle boxes, and a plurality of guide tubes extending vertically between the nozzle boxes;
a reactivity control device comprising a top tube sheet, a plurality of neutron absorber rods fixedly attached to the top tube sheet, and a floating guide plate slideably mounted on the absorber rods for upward and downward movement along the absorber rods, the absorber rods removably insertable into the guide tubes of the fuel assembly;
wherein the reactivity control device has a first uninstalled, position prior to insertion of the absorber rods into the fuel assembly in which the floating guide plate is spatially separated from the top tube sheet, and a second installed position after insertion of the absorber rods into the guide tubes of the fuel assembly in which the floating guide plate is abuttingly engaged with the top tube sheet.

14. The reactivity control device according to claim 13, wherein the top nozzle box includes an upwardly open top recess, the top tube sheet and floating guide plate being positioned inside the top recess when the reactivity control device is in the installed position.

15. The reactivity control device according to claim 13, wherein the floating guide plate includes arcuately rounded corners which are positioned inside truncated corner regions of the top nozzle box.

16. The reactivity control device according to claim 15, wherein the truncated corner regions are formed by inward facing angled inner corner surfaces formed adjacent to an upwardly open top recess defined by the top nozzle box.

17. The reactivity control device according to claim 13, wherein each of the guide tubes in the fuel assembly is accessible to the absorber rods of the reactivity control device through penetrations in top nozzle box, the penetrations arranged in a pattern that is the same as a pattern of the absorber rods on the reactivity control device.

18. The reactivity control device according to claim 13, further comprising a spent fuel pool containing water, the fuel assembly submerged in the pool with the reactivity control device inserted in the fuel assembly.

19. The reactivity control device according to claim 13, further comprising a canister including a fuel basket comprising a plurality of open cells, the fuel assembly disposed in one of the cells with the reactivity control device inserted in the fuel assembly.

20. A method for controlling reactivity in a spent nuclear fuel assembly removed from a nuclear reactor core, the method comprising:
removing a spent fuel assembly from a nuclear reactor core;
positioning a reactivity control device above the spent fuel assembly, the device comprising a top tube sheet, a plurality of absorber rods fixedly attached to the top tube sheet, and a floating guide plate slideably mounted on the absorber rods for upward and downward movement along the absorber rods, the top tube sheet and floating guide plate being spatially separated;
aligning each of the absorber rods with a corresponding one of a plurality of guide tubes disposed in the spent fuel assembly;
lowering the reactivity control device toward the spent fuel assembly;
inserting the absorber rods into the guide tubes;
abuttingly engaging firstly the floating guide plate with a top of the fuel assembly;
sliding the absorber rods through the floating guide plate while continuing to lower the reactivity control device toward the spent fuel assembly; and
abuttingly engaging secondly the top tube sheet with the floating guide plate, wherein the absorber rods are fully inserted in the guide tubes.

21. The method according to claim 20, wherein the aligning step includes angularly rotating the reactivity control device about its centerline until straight peripheral edges of the floating guide plate are oriented parallel to straight peripheral sidewalls of a top nozzle box mounted on the spent fuel assembly.

22. The method according to claim 21, wherein the aligning step includes vertically aligning arcuately shaped corners of the floating guide plate with truncated corner regions of the top nozzle box on the spent fuel assembly.

23. The method according to claim 20, wherein the abuttingly engaging firstly step includes positioning the floating guide plate against a floor plate of a top nozzle box of the fuel assembly that recessed below a top edge of the top nozzle box.

24. The method according to claim 23, wherein the floating guide plate and top tube sheet are recessed below the top edge of the top nozzle box.

* * * * *